United States Patent [19]
Ahl

[11] Patent Number: 5,666,653
[45] Date of Patent: Sep. 9, 1997

[54] WIDE AREA RADIO COMMUNICATION SYSTEM AND METHOD FOR COMMUNICATING IN A WIDE AREA THROUGH A WIDE AREA RADIO COMMUNICATION SYSTEM

[75] Inventor: Karl-Axel Ahl, Malmo, Sweden

[73] Assignee: Inventahl AB, Malmo, Sweden

[21] Appl. No.: 674,195

[22] Filed: Jul. 1, 1996

Related U.S. Application Data

[63] Continuation of Ser. No. 387,004, Jan. 19, 1995, abandoned, which is a continuation of Ser. No. 30,141, Mar. 4, 1993, abandoned.

[30] Foreign Application Priority Data

Aug. 7, 1990 [SE] Sweden ............................ 9002582
Apr. 26, 1991 [SE] Sweden ............................ 9101271

[51] Int. Cl.$^6$ .................................................. H04Q 07/30
[52] U.S. Cl. ........................ 455/330; 455/443; 455/501; 455/524
[58] Field of Search ......................... 455/33.1, 33.2, 455/33.3, 33.4, 53.1, 54.1, 54.2, 56.1, 12.1, 8; 379/58, 59; 375/200, 205; 370/95.3

[56] References Cited

U.S. PATENT DOCUMENTS

| | | |
|---|---|---|
| 4,775,999 | 10/1988 | Williams . |
| 4,833,701 | 5/1989 | Comroe et al. . |
| 5,239,671 | 8/1993 | Linquist et al. ............... 455/33.4 X |
| 5,260,700 | 11/1993 | Merchant et al. ............. 455/33.3 X |
| 5,414,414 | 5/1995 | Suzuki ............................. 455/8 X |
| 5,448,766 | 9/1995 | Sanning et al. .................. 455/8 X |

FOREIGN PATENT DOCUMENTS 9005432  5/1990  WIPO .

*Primary Examiner*—Reinhard J. Eisenzopf
*Assistant Examiner*—Philip J. Sobutka
*Attorney, Agent, or Firm*—Merchant, Gould, Smith, Edell, Welter & Schmidt, P.A.

[57] ABSTRACT

Wide area radio system comprising at least two central stations capable of maintaining communication to several peripheral stations within overlapping or adjacent service areas (110). Each central station is divided into a high frequency unit (992) and a low frequency function (991) operatively connected to said high frequency unit. Traffic interaction and coordination between said central stations in said radio system is provided through said low frequency functions (991) of said stations.

28 Claims, 21 Drawing Sheets

WIDE AREA RADIO COMMUNICATION SYSTEM AND METHOD FOR COMMUNICATING IN A WIDE AREA THROUGH A WIDE AREA RADIO COMMUNICATION SYSTEM

This is a File Wrapper continuation of application Ser. No. 08/387,004, filed on Jan. 19, 1995, now abandoned which is a continuation of Ser. No. 08/030,141, now abandoned, filed on Mar. 4, 1993.

BACKGROUND OF THE INVENTION

Wide area radio network systems of cellular type are well-known systems for solving communication problems. An example of such a system used in mobile applications is NMT (Nordic Mobile Telephone system) and GSM (Global System for Mobile communications). For fixed applications SR100 (Subscriber Radio) and SR500 from the Canadian Company (SR Telecom) can be mentioned.

In the systems mentioned, frequencies in adjacent or overlapping service areas that are served by the systems are used to prevent interferences between stations from occurring. This means that it is not possible to achieve redundancy in the system on common frequency bands in the different service areas which otherwise would be the most frequency efficient, and economic solution. There are also problems in expanding said systems with reference to capacity and area covering without a deterioration of the frequency efficiency.

Radio network systems comprise one or several central stations (CS) and a plurality of peripheral stations (PS) connected thereto. If a high security and an efficient redundancy, or recoupling ability between different CS operating within the same or any adjacent service area, should be obtainable within the framework of previously known technique said stations must be capable of operating on different frequencies so as to avoid interference. This leads to unnecessarily complicated and expensive stations. The construction and function of a CS in existing systems with respect to control functions is very fixed and no flexibility is allowed.

SUMMARY OF THE INVENTION

An object of the present invention is to overcome the problems mentioned above and to provide a radio network system also allowing interaction between different CS and PS and between control function units of said stations with respect to actual needs.

According to the invention there is provided, among other things, efficient redundant radio solutions, a flexible increase of capacity in modular steps, a modular economically flexible construction, and cooperation with wide band transport networks, or integration with logical telecommunication networks in different hierarchical or decentralized radio networks configurations. Thereby several new and essential properties are provided compared to the existing technique.

The method is implemented by combining several system components, and radio systems and functions that are constructed similar in character into subsystems. The central stations of said subsystems are provided with a transmission interface accomplishing a physical dividing of said stations into at least two main function units, a so called high frequency and a so called low frequency. The subsystems are provided with units which are similar in character, and with functions, i.e. for coordinating traffic simultaneously in the same or adjacent service area(s) on the same frequency band in time duplex or frequency-duplex, or adjacent or alternative frequency bands which can be established in dependency of a varying capacity demand or function to accomplish a modular capacity variation, an efficient redundancy and a flexible traffic coupling, and also a modular construction of varying service areas through interaction with other telecommunication networks, for instance wide band fiber solutions.

The subsystems are provided with centrally located central stations (CS), each of which covering a certain service area within for instance a cell sector, and according to which the physical construction of each CS provides a possibility to interact with other CS to accomplish, i.e., the new characteristics mentioned above.

Within each subsystem information is transferred for an internal signaling and also user traffic for one or a plurality of connected and geographically spread out peripheral stations (PS) within each service area. Said PS's are preferably constructed with units and a structure similar to the one used in said CS's if this is desired. A result thereof could be a number of advantages with respect to the implementation thereof.

In each of said subsystems connected customers share one or several common radio channels or transmissions resources. Fixedly set up or dynamically allocated channels are established for different needs of traffic capacity. Thereby several PS's under each of the CS's commonly can share one radio channel on one frequency band or one pair of frequencies. Varying flows of capacity can be allocated to different customers as parts of the total channel capacity in each of said subsystems.

The method and the implementation thereof in a system for a wide area radio will provide improvements over prior art technique within i.e. the following areas, to give a summary:

- a modular expansion in different service areas and a modular variation of capacity through an interaction with other telecommunication connections as a transporting network,
- equipment diversity and space diversity,
- a high and possible modular variation of the frequency efficiency,
- a flexibility at traffic stops by rearranging for different parts of a system,
- a modular and physically simple structure,
- new possibilities for coupling and traffic redundancy.

The method described in the present application as well as the generic method described in PCT/SE89/00470 and PCT/SE90/00681can be used in terrestrial wide area radio systems or can be implemented in satellite systems. Parts of a CS, i.e. the radio antenna and control units, are mounted in the satellite. Communication can be established between the CS's and also between a CS and a PS.

Prior art technique in the technical field of wide area radio is characterized for instance by TDMA (Time Division Multiple Access) for sharing resources of radio channels, for instance in fixed applications by allowing only one frequency band to be utilized for one central station at a time. To obtain redundancy, for instance 1+1 solutions, that is one permanent and one standby-radio channel, which should be allowed to operate simultaneously, an allocation of parallel frequencies is required.

FIG. 1 shows the basic construction of a wide area radio system in fixed applications. Said figure shows schematically an example of the problem of obtaining redundancy, diversity. When only redundancy with respect to the equipment is desired, the systems are provided with, for instance, a parallel radio unit functioning at the same frequency band as the operating system. If the operating radio unit gets out of order, it is possible to switch on the other unit.

The problem shows that frequencies should be exchanged to obtain a full redundancy or a parallel operation of several systems. The example described above also shows the difficulties of obtaining a high frequency efficiency with conventional wide area systems. In cases where frequency efficiency is desired, isolation is required which can be achieved by distances between different cells functioning on the same frequency band, if they should operate simultaneously. If such systems are delimited to smaller cells or a smaller covered area, the frequency efficiency is increased and a given frequency can be repeated more frequently within an area. This technique is utilized mainly within mobile communication. If for instance a communication solution is desired outside houses and buildings, this would lead to drawbacks such as a short range of operation, and many base stations would be required. No methods or systems are developed for wide area radio systems providing an interaction and coordination and coupling of traffic between alternative CS's of similar structure at the same "sites", each of which covering an adjacent cell, the same cell, sectors or space, and also geographically spread out peripheral stations (PS) connected thereto and signals connected to said peripheral stations between each other for conventional wide area systems or systems according to the international applications mentioned above utilizing a time and space multiplexing to achieve redundancy and traffic interaction, different frequency bands not necessarily being utilized for the different CS's, even though they are transmitting or receiving information simultaneously. From the applications PCS/SE89/0047 and PCT/SE90/00681, methods and possibilities are known for providing frequency efficient radio communication systems having a high capacity. By building radio networks of said type according to the method and system described below, a structure of cellular radio networks that are new and powerful and having a dramatically higher flexibility can be provided compared to prior art technique.

BRIEF DESCRIPTION OF THE DRAWINGS

The description is accompanied by drawings, of which

DETAILED DESCRIPTION OF THE PREFERRED EMBODIMENT

Figure 1:
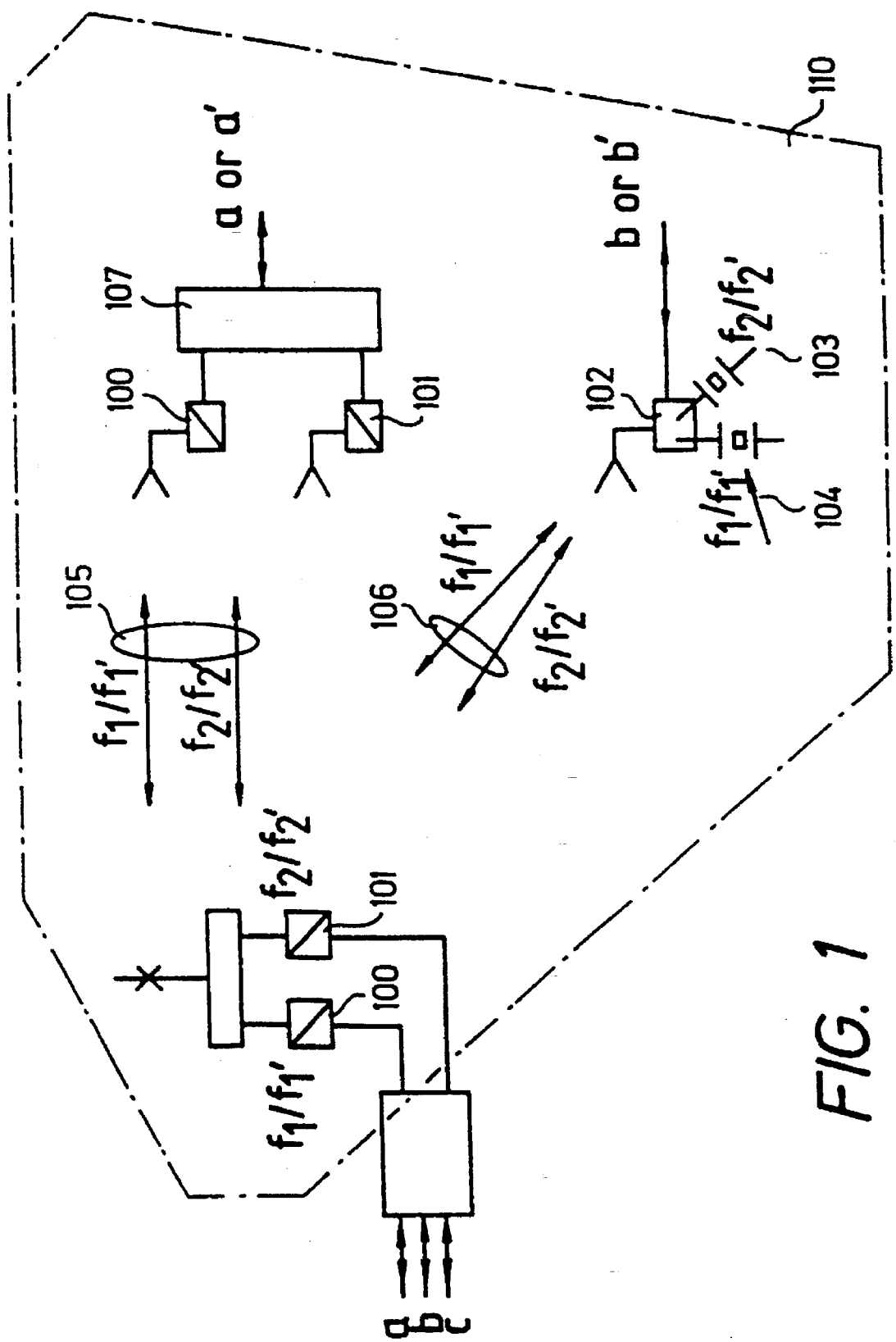
FIG. 1 is an example of a prior art wide area system having redundancy.

In prior art wide area systems or radio link systems, the recoupling for achieving redundancy (1+1) within the same covering area is done through physically parallel units for different or the same alternative frequencies where they should be able to operate in parallel within the same area/ space as mentioned above. FIG. 1 shows different typical routes 105,106 between central and peripheral stations in a conventional system.

The method according to the present application is based on a type of modular structure for wide area radio according to which a time and space controlled multiplexing is utilized. Station units and parts of systems, so called subsystems, are structured to provide in a flexible way the properties mentioned above. There is an efficient interaction and coordination between subsystems and also between parts of said subsystems, providing among other things traffic interaction at one and the same frequency band simultaneously within common service areas.

A service area is defined as an area or covering area in which each CS can maintain communication with geographically spread out units up to a certain transmission quality. The method is implemented in a system comprising two or more subsystems.

Each subsystem consists of a Central Station (CS) and one or several Peripheral Stations (PS). Several subsystems operating at the same site will be referred to as Super Central Station (SCS). Each CS is divided into a high frequency unit and a low frequency unit, so called HFU/LFU, to provide a flexible practical implementation, integration and interaction with other telecommunication network systems, for instance wide band fiber systems, microwave links etc. Each communication within each subsystem is constituted by defining during a certain time period a communication link between two stations, for instance between a CS and a PS. Such communication links will constitute temporarily established so called radio steps. Simultaneously existing and parallelly established radio steps can exist in subsystems operating in parallel even within the same frequency band for subsystems operating within the same service area.

The separation in a HFU and a LFU permits that a plurality of EFU units spread out can terminate in one and the same point, a so called Central Terminating Point (CTP). Thus, at the CTP there is an efficient communication and coupling, etc., between the subsystems. You could say that each CS radio in each subsystem divides the total available capacity in time gaps in a repeated pattern, each time gap being available for different needs of transaction for each radio step according to a so called TDMA frame structure. This could be done for instance by a CS transmitter transmitting during a number of time gaps during a certain time period and by different PS stations transmitting during a subsequent time segment a number of time frames, if the system is implemented for time duplex. In this way each CS and PS transmits and receives alternatively in intervals. A transmitting time interval for a CS is referred to as a CSSF (CS Send Frame) and for a PS PSSF (PS Send Frame), respectively. The length of a CSSF and a PSSF, respectively, in this type of subsystems depends on the traffic flow in both directions. By choosing a transmitting interval for a CS and a PS, respectively, comparatively long as compared to a time gap interval there is achieved an efficient protection with regard to interference between subsystems by synchronization to make the allowed transmitting time period for a CS and a PS, respectively, coincide if frequency duplex is applied, time gaps for transmitting and receiving, respectively, within each subsystem coincide. A HFU unit of a CS preferably consist of at least one antenna system, which dynamically during each time gap is directed to the current station so as to form a radio step.

Normally traffic flows are carried out individually in each subsystem, but there is a coordination of traffic transmissions in different subsystems to obtain an interworking of the capacity of each of the subsystems through a coupling of traffic flows within and between wide area radio system modules by adapting the interaction to create in time and space a diversity of transmission routes and to make possible an efficient utilization of the same frequency band or alternative frequency bands in each of the subsystems.

A modular and equal structure of the subsystems and the units thereof provides an efficient redirection of traffic according to the present method, makes possible a uniform extension in modules of the covering area of capacity and service, and provides a simple structure keeping low the costs for production and implementation of the system. Digital traffic couplings are then made on a digital level and not through radio transmission.

In the event of traffic blocking situations or a deterioration of transmission quality, it is then possible to maintain the transmission capability and quality in a wide area radio system in a far more powerful and flexible way than ever possible with prior art systems. The modular structure of the subsystems and/or a number of basically uniformly constructed subsystems on the same "sites" or different "sites" will provide a simplicity in the communication and interaction for a dynamic allocation of resources in time and space between the subsystems.

Each of said subsystems is normally arranged autonomously to each other together with the PS:s associated thereto. As an alternative there is a parallel interaction between several subsystems within the same service area or adjacent service areas. There is a connection in steps of the required number of subsystems in a geographic area according to customer's needs, the capacity requirements, and the functional requirements. This structuring method will provide, especially for SCS and CTP, an attractive way of structuring because common functions can be made use of in interaction between the subsystems. Thereby a varying degree of frequency efficiency can be obtained in different modular steps because all or several of the subsystems covering the same or adjacent service areas can operate at the same frequency band. Thus, according to the method, a modular change of capacity or area covering can be obtained, basically in steps of the capacity of each of the subsystems. When applying more than one subsystem at the same site covering the same area there is in a varying degree a further increase of capacity depending among other things on the number of subsystems applied to a present covering area, the number of time gaps in each subsystem, an allocation of time gaps, the method of allocating traffic, modulation, coding, polarization, a possibility of changing the radio frequency, the antenna design for CS and PS with regard to level of side lobes, opening angles, interchange time, etc. Between the subsystems there is obtained more or less a total increase of capacity of each of the subsystems when connecting the subsystems on the same or adjacent service areas, depending for instance on the efficiency of the traffic allocation algorithms, the antenna design, etc. that are applied. The degree of increase of capacity within a given area covered by several subsystems depends also on the intensity of the traffic, if and how the traffic dynamics are applied in the system, the size of the opening angles of the antennas, the antenna side lobes, tolerance to interferences of the modulation method, etc. A directional antenna system having an opening angle of up to approximately 20° at each HFU, which can be directed on a time gap level at least in a horizontal plane within a sector of for instance approximately 90°, would basically increase the traffic capacity a number of times compared to a system utilizing a sector antenna of 90°. Also other divisions of sectors are of course possible. If for instance several CS are arranged to cover the same service area, conditions exist for a doubling in principal of the capacity provided that the time intervals and directions between the two subsystems are separated, and that interferences due to side lobes etc. or energy levels which may vary in the stations of the subsystem are controlled in an efficient way, i.e. that the effective signal compared to an interference signal can be kept large enough to achieve an approved quality. Furthermore, this would lead to that an efficient recoupling and redundancy can be obtained. Optimization, for instance between side lobe interferences, modulations, demodulation method of each of the subsystems with regard to a so called "co-channel interference" is done when alternative embodiments of the systems are chosen. A CS antenna system will be arranged to achieve a reception in undesired directions within the covering area thereof which will have an appropriate isolation with regard to subsystems operating in parallel. In an appropriate embodiment and election of modulation method, for instance PSK, MSK or the like, a difference in signal between a desired signal and an undesired signal of between 15-20 db could be enough. By balancing the modulation method, immunity to interferences, wide band requirements, etc., in relation to the requirements of the side lobe, levels of the antenna's price and performance are optimized between different system applications.

Figure 2:
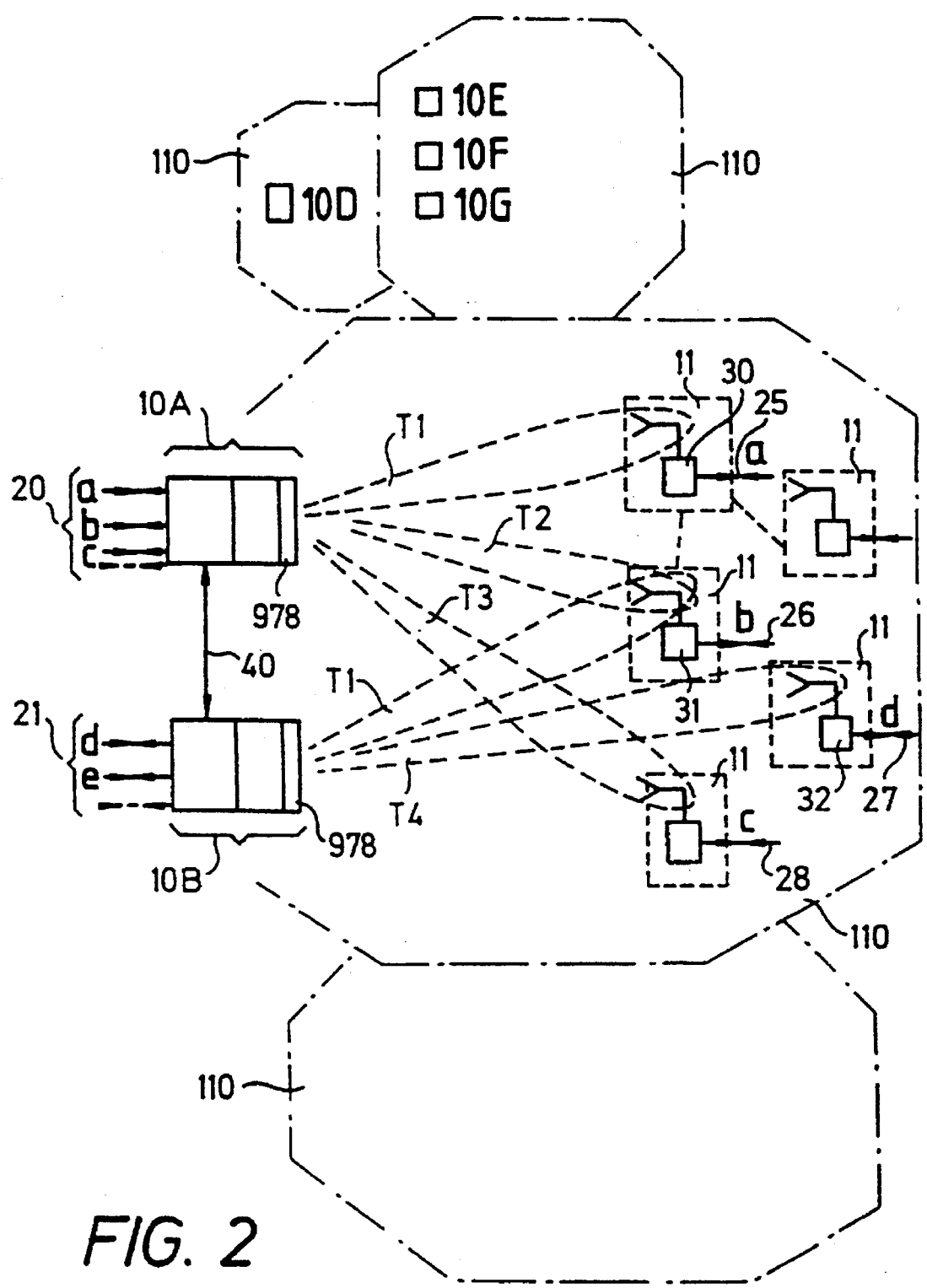
FIG. 2 shows an example of interaction between subsystems in one region at the same time and in a given frequency interval.

When choosing a robust and interference resisting modulation said method can be implemented with antennas having a high capacity performance for systems at low costs and a defined physical size. Choosing for instance very "thin" main lobes having an opening angle of for instance one or a few degrees, with low side lobe levels will improve system performance and capacity in a system. In systems implemented in reality there is a balance between price and function. In the described example the variation of the polarization, a further coding, etc., has not been considered. When applying for instance time and space control and using so called "spread spectrum" in CDMA or frequency steps an even higher interference between subsystems can be resisted. Also combinations of different forms of modulation, coding, etc., can improve the efficiency of a system implementation. The CDMA technique can for instance be applied by implementing to each radio channel several signals coded in parallel either separately or for instance, in interaction with a narrow band modulation. To further limit the interference of such an arrangement for instance the election of code to be transferred between the subsystems may differ or for instance alternate. The method of structure and the implementation thereof will have the following results: an improved reuse of frequencies, alternative advancing paths for connected traffic in the either through subsystems or parts of subsystems (two CS units may for instance communicate with one PS unit) so as to eliminate deterioration of quality with regard to propagation, errors in the equipment, etc., for each of the applications. For instance, alternative paths blocking of the traffic in a subsystem are created in an efficient way. A short-term relief of subsystems heavily loaded by traffic is made by redirecting some part of the traffic through a parallel or several parallel CS unit(s) covering a corresponding or an adjacent service area. The structure will make possible an internal coordination between subsystems to provide among other things the functions mentioned above in a point if this is desired for a number of geographically spread out sector or cell configurations, at a so called CTP. For example, when there are errors in the equipment of a CS unit traffic can be redirected to a CS unit operating in parallel. Instead of two CS units covering the same or parts of the same area more than two CS units may cover the same area and interact in a corresponding way. A complete isolation and extended improvement of capacity can be obtained in a smooth way between subsystems arranged for one frequency band by allowing a rotation of the polarization between subsystems or within a subsystem. FIG. 2 shows an example of a basic implementation of a system according to which the traffic interacts in accordance with the present method by utilizing one and the same frequency or alternative frequencies. According to the method time intervals, direction, assumably energy, frequency, polarization, etc., are coordinated within each subsystem. The structure and operation of the method mean that CS units 10 or said PS units 11, by choosing different time intervals and directions T1, T2, T3, T4 . . . etc. simultaneously can operate and handle traffic between each other if this is required, and also alternative stations as a result of the similar structure, also at the same frequency band.

It is also illustrated that traffic 20,21 connected to two CS units 10A, B and traffic 25,26,27,28 connected to several different PS units during the same time interval can be handled by CS units geographically covering the same or parts of the same service area 110, also at the same frequency band. If each of said subsystems is constructed similar in character in a structured way according to this description a plurality of powerful system advantages are obtained. By having several CS units covering the same or adjacent service area(s) it can be determined in a flexible way which CS unit(s) constitute a reserve to another PS units or other PS units.

One or several CS units geographically covering different or common cells or sectors communicate with geographically spread out PS units. Each CS unit may communicate with associated PS units. As a result of one or several subsystems handling traffic at the same frequency band by a division in for instance time intervals and direction for transmission in each of the systems there can be a smooth recoupling of traffic between stations in different subsystems. In such cases, where several CS units on the same "site" operate in the same or a geographically adjacent area, there is a coordination for using time intervals and space between the subsystems to keep low the interference, depending on the requirements in each of the implemented systems. Efficient solutions will be obtained irrespective of whether all of the stations operate at the same, adjacent frequency band or at alternative frequency bands. By allowing that several PS units in such implementations to operate at one and the same frequency without a required recoupling of channel an economic implementation is obtained. Such an embodiment will simplify substantially the construction of a PS. In spite of this, the method will allow redundancy in the CS and in the PS.

When using time duplex normally time frames for several subsystems are coordinated, at least at the same site. This will result in a lower interference. In such cases where an increased frequency efficiency and/or immunity to interferencies, etc., is required, the systems are provided with a possibility to operate at alternative frequency bands. The method is used also in radio channels where the users share a radio channel in time, in so called time gaps in a TDMA. Also "Width Modulating Systems", such as "Spread Spectrum" having a coded separation, so called CDMA (Code Division Multiple Access) or frequency stepping solutions can be applied, and also combinations of TDMA, CDMA, frequency stepping, or FDMA. One or several channels may occupy available frequency bands, i.e. signals modulated in parallel can be transferred in a radio channel. Methods for modulating according the so called slip code method will result in a high number of bits per second, and herz being used during transfer in the radio channel. Different methods of modulation in combination with adaptive corrections for non-linearities in amplifiers, etc., are implemented if required. A low interference, a high frequency efficiency and a high redundancy is obtained when using only one frequency band. When there are demands for traffic recouplings within and between subsystems, due to a high traffic load, errors in the equipment, propagation problems, redisposing of PS stations, etc., between stations, the system effectively creates a redundancy and redirects a possibility of traffic flows between alternative stations at one or more central terminating points. Normally the method is implemented to transfer digital transmission flows of multiplexed or non-multiplexed type, synchronous or asynchronous flows or synchronous or asynchronous multiplexing.

FIG. 2 shows dynamically directed antenna lobes within service areas 110. Two different CS units 10A, 10B at the same site cooperate in principal to provide among other things redundancy and an efficient utilization of the frequency spectrum at for instance one frequency band. The subsystem having the CS unit 10A communicates with one or several PS units at different sites 30,31, etc. The subsystem with the CS unit 10B illustrates the sites 31,32. In this case it is shown that said two service areas coincide. When for instance coordinating time utilization, i.e. for instance the election of different time gaps T1 and T2 in for instance a TDMA system a PS unit 31 can communicate with both of the CS units at a common frequency. T1, . . . T4 indicate different time intervals. a,b,c,d,e represent connected signals to and from a CS–PS. The system shown in said figure covers a service area 110 which can be common as a whole or in part or be complementing so as to double the service area. 10A represents a subsystem comprising an antenna system 978. Transactions of information, communication for traffic coordination, control of transactions for information, etc., between the subsystems or between CS's are shown schematically at 40. When two or several subsystems operate at the same frequency band at the same site to cover the same or parts of the same geographic area they are coordinated in time and direction, etc., so as to avoid interference as a result of several CS antenna systems having the "same" direction during the same time period. In some applications the demands for a continuous quality can be defined in such a way that errors occurring randomly are handled by systems in a higher level according to the OSI model, for instance levely, or retransmitting etc., for data communication. In systems which do not comprise such functions, for instance transfer of speech, normally the system should provide a sufficient quality of transfer for each service. If interference is detected to exceed an allowed level in spite of, for instance, a preventive coordination in form of polarization, coding, frequency, etc., there could be a change of utilization of time and direction of time gaps in the TDMA system. The above is only one example of the flexibility of adaptive correction. Irrespective of each method or methods used that can be combined, or the order thereof varies between different implementations. The applied external flow of information that is to be transferred through the system normally is provided with a quality control that is more simple than the information checking and controlling the system. Different time gaps in a TDMA implementation can be applied for information or control information. Each of the CS units controls, coordinates, for instance, the assignment of time utilization for each of the PS units. Through the control information there is a signal connection between a CS unit and a PS unit. Such data should be safe and mostly rapidly readable at the opposite side. The signal channels are formed according to actual needs in different systems. For systems implemented in fixed solutions with, for instance, open view connections between stations communicating, it is possible in most applications to apply error controlling codes because fading and multipathing statistically exist in short bursts. In systems capable of generating a high internal interference in the system, for instance, a plurality of adjacent cells/sectors, or in some other aspects are considered to have an-unpredictable quality of transmissions, normally a more powerful coding is applied. This is most important for signaling data. Furthermore, at for instance a dynamic traffic allocation the quality situation is difficult to predict continuously. The structure of distributed HFU units and the possibility of centrally disposed LFU units at the CTP will have the effect that communication between subsystems, when choosing time gaps, can be coordinated effectively in advance, and also corrected, at one position in a geographically spread out and branched radio network. It is also possible to have an adaptive correction of control or user data. The type of coding on a total channel level or, for instance, on a time gap level can vary independently of specific customer or quality requirements in different embodiments of the system. Depending on the level of the desired frequency efficiency, etc., modulation and antenna types are also chosen specifically for each system according to actual requirements. When choosing a robust interference resisting modulation, such as QPSK and a differential detecting for TDMA, comparatively moderate requirements of antenna design may be tolerated, for instance approximately 18–20 db of side lobe attenuation on a CS antenna will provide a comparatively high total traffic handling in a system comprising a large number of cells in a hexagonal cell pattern. Methods such as processing of coding signals, other modulation, etc., are applied in cooperation with the choosing of antenna performance when for instance the system capacity is optimized. The above is only one example of a robust implementation. Several alternative possibilities with alternative elections of modulation, coding, antenna design, etc., can exist in dependence of specific system requirements for different services, etc. The immunity to interferences can for instance be further lowered by choosing another modulation, coding, possible change of polarization, etc., further increasing the capacity in total of the system. If an alternative frequency or alternative frequencies are applied in a system the capacity is further increased. The total capacity in a system between cells of the pattern mentioned above is strongly affected also by the election of the antenna lobes and side lobe levels of the PS antennas. Signals to be transferred are coded when required in different applications depending on customer demands to provide a desired secrecy of the system. For instance, by changing time gaps, bit flows and other similar measures, the secrecy can be improved in a comparatively simple way. The system is constructed to allow traffic flows within parts of subsystems (for instance the communication of a PS with a CS) and subsystems and also to and from the system, to be parallel or to provide an alternative transmission. The meaning of this is that one or several CS at the same site can communicate with one or several PS units on the same site, i.e. simultaneously transfer traffic also at one and the same frequency band. Alternative transmission routes between basic units of a subsystem can be chosen, controlled, coordinated and supervised in time for the complete or parts of the transmission demands of the present information. This is indeed simple if the system is constructed for only one frequency band. There can be a redirection of alternative paths without the necessity of changing frequency between several CS, PS units in such cases where several CS units cover the same or partly the same geographic area.

From the user's point of view there is a transparent transmission with a constant or controlled delay to satisfy synchronous transmission demands, or, for instance, for speech, on condition that the capacity can be allocated, that there is a sufficient amount of capacity available for the connected traffic. This is done independently of which path, which subsystem or which station that has been chosen. For instance, can a part of/some time gaps in synchronous multiplexed signals, cell/cells in asynchronously multiplexed signals, etc., be transferred in time gaps in each of the systems.

Figure 3:
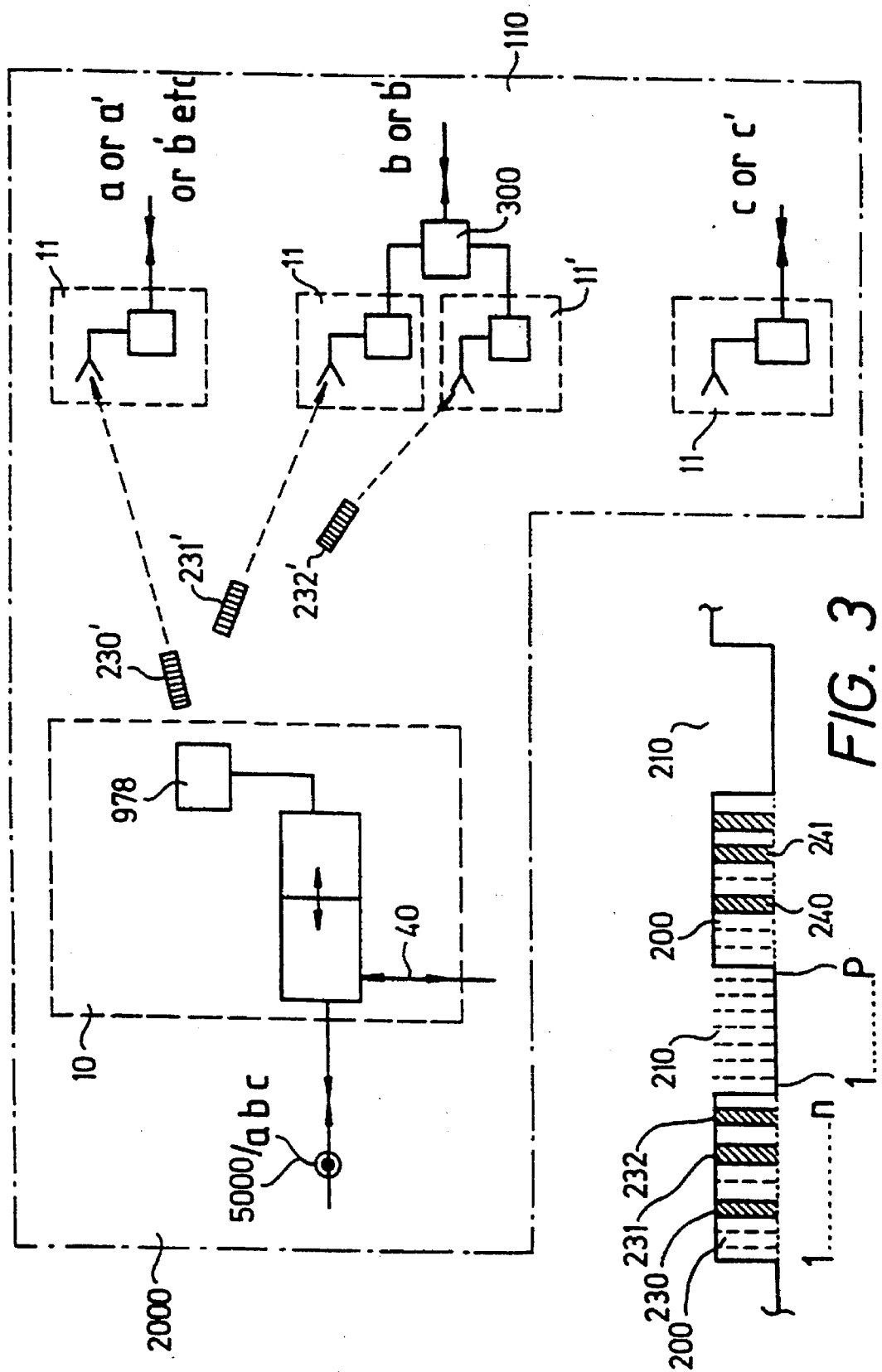
FIG. 3 shows an example of a redundant coupling in a PS.

FIG. 3 shows schematically an example of a subsystem 2000 constituting a system or a part of a system, which in this case is a time duplex system. A frame structure with interchanging time periods for CSSF 200 and PSSF 210 is illustrated. The CS 10 of the subsystem is communicating with one or several PS units. The figure shows an example of an redundant PS coupling 11/11' and also couplings an 11 on the PS units which are not redundant. The example illustrates the flexible possibilities, not only to create redundant coupling in a CS unit by, for instance, doubling the parts there could be provided when required, but also PS units operating in parallel with for instance one and the same CS 10, where different time periods for packages 231', 233'of information are used between the two stations for a doubling or a transmission in parallel of information by choosing different time periods 231, 232 for a transaction to a PS in a time frame for the subsystem. Recoupling, summing up or any desired signal processing, etc., of the information is provided when required in a signal processing unit 300. User information 5000 or a,b,c is transferred for instance schematically through the system from a CS to the appropriate PS units by sending fragments of information during shown time gaps 230, 231, 232 in appropriate directions in so called packages 230', 231', 232'Reference a' denotes a portion of the information a and the corresponding applies for b' and c' etc. A synchronization of incoming digital packages of information is performed at the opposite station. As the PS units are constructed in the financially best possible way they are normally not provided with a clock that is more stable than necessary so as to primarily be able to receive messages and thereby be synchronized from a CS handling over in intervals reference data for a correct synchronization timing data, etc. A fast detection, for instance, a differential detection or noncoherent detection will keep down the required information to achieve synchronization. The systems can be constructed for different types of synchronization between CS and PS depending on the function requirements. Synchronization information can, for instance, be added to each package or transmission of synchronization packages at certain intervals where stations receiving information will keep the pace on a controlled fixed level between the synchronization intervals. The PS stations will receive the digital clock pace from the incoming information from ECS. The radio transmission in each subsystem is done to and from each CS through a dynamically directable radio transaction shown in the figure as an antenna system 978, which as to the direction thereof is coordinated with another station presently exchanging information with.

The communication link 40 illustrates schematically signaling, coordination, interaction or possible traffic redirections between other subsystems etc. FIG. 3 shows transmission only in one direction but the transmission from the PS unit towards the CS unit is similar. The CS unit coordinating the traffic in the associated subsystem knows at what point of time and from which PS it is expected to receive messages and therefor the antenna system 978 thereof is directed appropriately during that time period. The synchronization between subsystems, the distance coordination etc. between different subsystems covering different or adjacent service areas is described below with reference to FIG. 11b, FIG. 12.

The synchronization between different subsystems and systems normally is done on a time frame level for systems in time duplex as this normally is possible to achieve in a simple manner. If only frame synchronization is applied a time gap in one system could for instance affect two in another. The structure further results in that geographically spread out CS antenna systems also with respect to synchronization in relation to each other can be coordinated effectively to be minimized for, for instance, a central point which is described below. When applied in a CS and a PS, respectively, there is achieved a continuous optimization with regard to quality through radio steps connectable in space and time according to FIGS. 2 and 3:

via one or two or more CS Units operating with two or more PS units.

connected traffic is transferred by bursts divided into time fragments in a radio channel of each subsystem with the transfer capacity thereof.

The transferred information is signal processed when required in a method schematically shown in FIG. 2 where a signal processing function 300 is utilized to obtain an improved quality of present transmissions in a system or a subsystem. Alternatively a first or a second path is chosen at 300 for a specific application.

In fixed connections, stationary PS, there is obtained a possibility to predict so as to compensate for reflections of the respective radio step, etc. Signal processing is generally applied in this way in system implementations requiring it. The application thereof is indeed interesting in such cases where systems should be applied basically without any accurate studies of radio steps. In for instance an urban environment there could easily be a complex multipathing by reflections from houses, walls, roofs, etc. Systems which are controlled in time and space could in each transaction time period be looked upon as a point to point radio transmission. In conventional radio link systems of point to point type normally the step length is a critical factor in multipathing. Implementations of complex modulation methods such as QAM, etc., for improving the frequency efficiency are other factors that can cause problems with quality.

The utilization of time and space controlled systems, which for instance are implemented according to the present system/method, such as terrestrial access networks in applications with for instance connections to wide band networks in urban or suburban environments, which are constructed with robust modulation methods or the like, which will result in another type of quality deterioration on the radio channel which to a large extent is based on reflection in roofs, walls, etc. Due to the fact that these are fixed in relation to changes occurring in the either, for instance a frequency selective fading over longer steps or compared to mobile peripheral stations, a more stabilized behavior will occur which more easily can be predicted with regard to distortion and influence on the radio channel. Therefore, a more simple correction of the deterioration of the radio channel can be realized in this type of fixed application. When for instance a new PS is applied then correcting calculations can be performed. After a correction this data could be applicable during probably a longer time period in such networks as compared to conventional radio steps or mobile applications, etc. Wide area radio networks implemented according to the present principle for fixed applications normally are provided with this type of adapted correction which can comprise signal processing of incoming data or for instance changes or polarization to compensate multipathing in the radio channel, especially for systems implemented in an urban environment. Transmission properties which are caused by reflections are avoided in the system by a simple adaptive correction, for instance by changing the polarization. If for instance a horizontal polarization is affected by reflections from roofs, etc., a change to a vertical polarization could improve the signal quality.

Due to the fact that the separately used transmission path according to FIG. 3 may occur during the same SFCS 200, 210, but during different time gaps 231, 232, normally redundant information, which is transferred in parallel, could be processed without any delay to take mention of without any influence on normal telecommunication services in a decisive negative way. This means that the flow of information transparently transferred from each established radio step through packages 231, 232 could be regarded as and processed with for instance a digital process technology to accomplish improvements of quality, detection of quality, etc.

Figure 4:
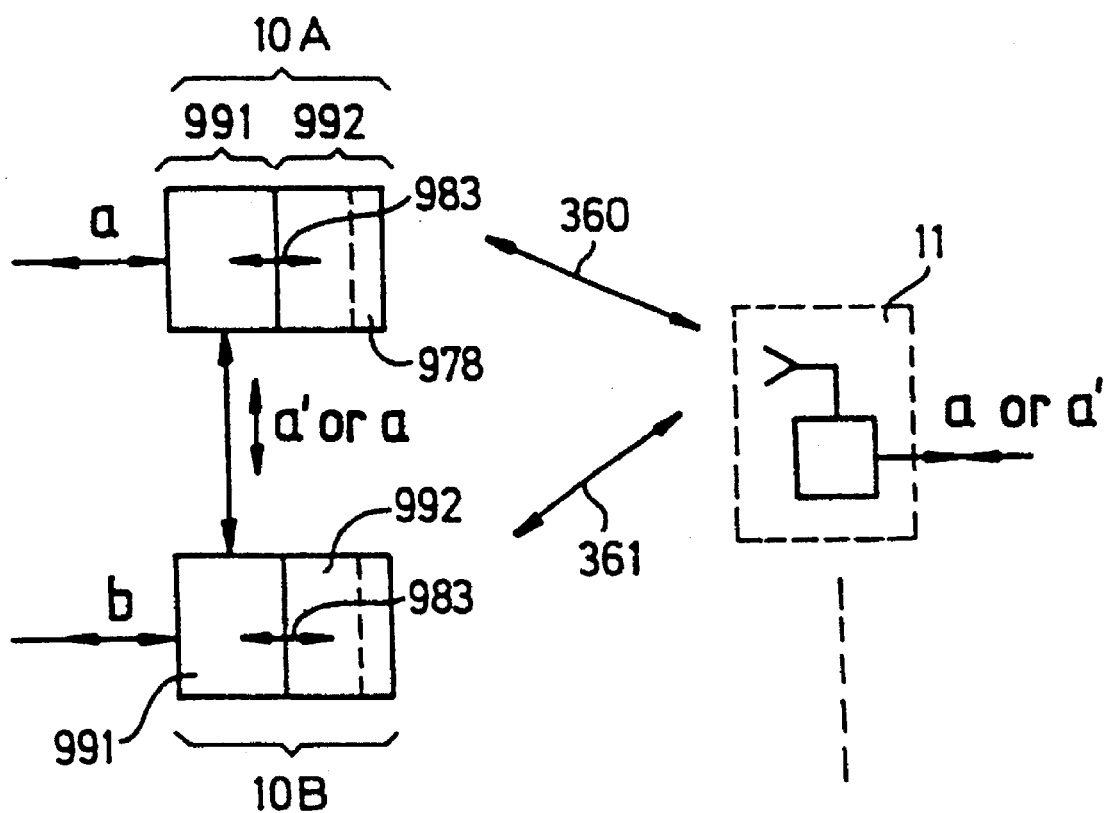
FIG. 4 shows an example of two or more CS's which are capable of interchanging traffic with a PS within the same frequency area at different time intervals.

FIG. 4 shows further details in the structure of a subsystem CS resulting in several of the previously mentioned advantages with respect to modularity, redirecting, redundancy, etc., when the method is implemented. Each CS is divided into a low frequency unit (LFU) 991 and a high frequency Unit (HFU) 992 and a transparent communication interface 983 therebetween. Said low frequency unit (LFU) comprises digital transmission units, logical functions for controlling and coordinating connected PS units under each CS and also interaction with other subsystems, etc. Said high frequency unit 992 comprises functions for converting a digital transmission 983 which is connected to and from radio modem units, and also by required controlled data from 981 for controlling the antenna system with respect to time and direction, for coordinating with respect to time radio transactions, for switching between transmitting and receiving during time duplex, for controlling radio between different frequencies, for alternating codes, for applying diversity on the radio connection, etc. The control objects are determined at 991. Said low frequency unit 991 has a slave function in relation to the high frequency unit 992. The function of the high frequency unit and the low frequency unit, respectively, is normally formed to be integrated in such a way that several low frequency units 991 and/or several high frequency units 992 are integrated to one function unit. This applies for instance for super central stations, SCS, which are described below. APS 11 communicating for instance with two CS units 10A, 10B, at the same frequency is capable of transmitting, receiving, information 360, 361 to and from two different subsystem CS 10A; 10B for instance operating at one and the same frequency band. This may be done on condition that different time periods are chosen for the transfer of each of the packages, if not for instance a powerful coding separates the information, user information could simultaneously be transferred to and from one and the same PS. One PS could for instance in this way be connected in a passive way, i.e. connected to a redundant CS without loading in a degree worth mentioning the traffic capacity of the subsystem. In such a case one of the CS units will for instance utilize sometime gap, or any corresponding element, in the actual time frame at a fewer number of intervals CSSF, PSSF than made possible by the time frame. In the shown example the CS unit 10A could be said to be actively coupled to a subsystem with the shown PS. The shown PS could for instance be connected in a passive way to the second CS unit by using in fragments the capacity of the second subsystem, that is, it could be requested in intervals to confirm that it is connected to 10B or that it would be possible to connect traffic at 10B. When such demands exist the complete or parts of the traffic can be redirected permanently or temporarily to a former passive PS. Said figure shows in principle that an example of a connected traffic (a) can be connected through 40 between 10a and 10b. The coupling function between different subsystems is performed in digital form so as to create flexibility and a cheap implementation. Parts of a signal could for instance be transferred through one subsystem and other parts through another, if this is desired.

Directed radio steps having corresponding properties as those obtained in a conventional radio link system are established in systems between two stations, SC and respective PS, and they can be considered to be established in the subsystem under allocated time intervals. The result is real time fragmented point to point connections or virtual point to multipoint communication.

Normally it is more important to the total system security to have redundancy at the CS unit than at the PS unit. An error on a CS could break, down a complete subsystem with a plurality of PS units. The flexible possible parallel operation of two or more CS's which basically could cover the same service area and normally increase the traffic capacity in the service area, but also functioning as a stand-by if errors occur, is important especially when implementing a system within one and the same frequency band. Of course other redundant structures than illustrated here could be realized. A direct doubling of vital or all of the modules of a CS could for instance be formed with parallel redundant functions so as to have another unit or function to take over in the event of a unit, function, etc., being in operating should fail. This is a traditional method of creating redundancy. The advantage with the present method is besides the provision of redundancy for instance that two or more subsystems at the same time can handle traffic separately within the same area or adjacent areas and at the same time function as a security to each other also at the same frequency. From the description above it is clear that the method will provide a high degree of flexibility for the creation of efficient networks solutions.

Figure 5:
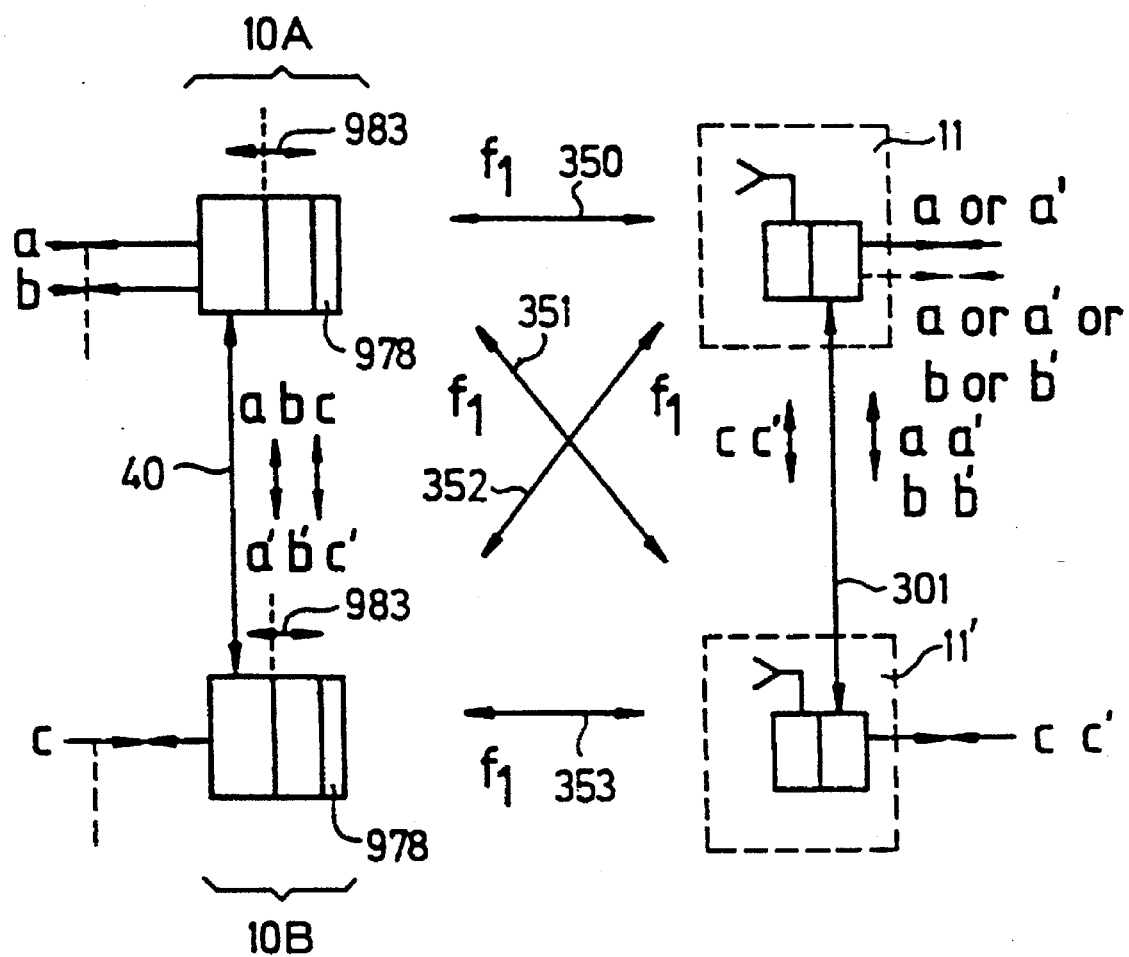
FIG. 5 shows an example of efficient redundancy by combining the examples of FIG. 3 and FIG. 4.

FIG. 5 shows the increased flexible possibilities of alternative transmission paths or radio steps at one and the same frequency. There are possibilities for a parallel transmission and also implementation of for instance fast switching between regular paths and auxiliary paths in form of a so called "hot stand-by". A fast switching is accomplished in that for instance any desired redundant information is applied to an associated redundant CS where it is possible either to:

1. transfer information a) to the same PS if one PS is used through alternative steps 360, 361 (see FIG. 4). In this case a preparation is performed of a CS so as said CS is capable of taking over traffic from 360 (FIG. 4) when required for one or several PS:s, though there is no traffic transferred redundantly through said PS. The amount of preparations could have different levels up to a level where there is a continuous time allocation for an auxiliary path to make possible the fastest application ever possible of traffic and switching to a stand-by path.

2. transfer information a) to another PS or another CS if two or more PS:s are used, FIG. 5, through alternative radio steps 350,351,352,353. In this case the same basics applies as mentioned above for a PS with respect to the preparation of alternative paths. Furthermore, when using for instance two PS:s for one application four alternative step paths will be obtained as shown in the example of FIG. 5. One or two of said paths can permanently be active to an application if required. The election of a transmission path or signal processing of two transmission paths can be made for an optimum quality of the transmission. As an alternative one transmission path is active and a second one is redundant without ever transmitting the redundant information. It is also possible to increase or doubling, or splitting in two alternative transmission paths the transmission at the same time. In this case there is achieved also redundancy at the two other radio steps 350, 352. The actual frequency band during the shown time is fl and identical to all of the shown subsystems.

FIG. 5 and the above description show the possibilities of the method and of course also variations thereof are possible with another configuration or another system embodiment. FIG. 5 shows two subsystems, each of which is provided with a switching function 900 (see FIG. 6) through a communication link 40. From the figure it is clear that there is a switching so as to create alternative transmission paths between the subsystems which will mean that any of the two CS units shown could be used. A corresponding function can be established for redundant PS coupling through the switching unit 300 and a communication link 301. Instead of what is illustrated with two different switching functions 900 and 300, respectively, for each of the CS, PS it is also possible to consider the switching function or construct the switching function as an integrated unit for more than CS or PS. For instance the following basics could apply when transferring redundant information:

assign traffic capacity for a separate stand-by path, and transfer redundant data.

assign time continuously in a time frame in advance for a stand-by path without transferring customer information unless required.

assign, if required, time in a chosen, spare, etc., stand-by CS when the regular step has reached a defined quality deterioration.

Also other forms of assignments and preparation may be provided, and what is described above is only one example of the possibilities. As an alternative one or several PS units could be common to one or several PS units for the same application in accordance with what is disclosed above.

FIG. 5 shows further advantages of the method. The example shows that for instance 1+1 redundant CS and redundant 1+1 PS will provide four alternative transfer paths 350,351,352,353 in each direction in accordance with what is disclosed above.

When choosing for instance more than one frequency band basically even more possibilities are created.

Figure 6A:
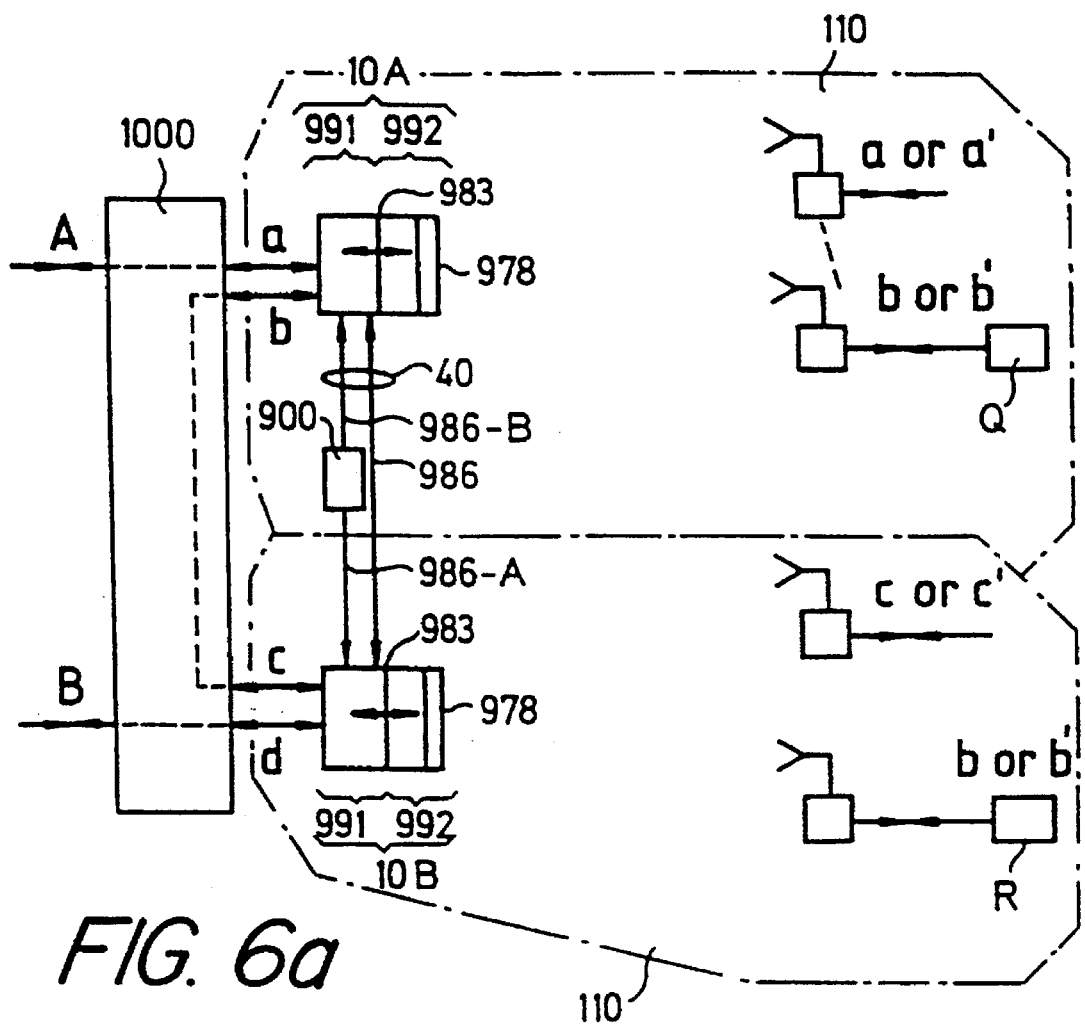
FIG. 6a shows an example of interaction and traffic coupling between subsystems through an external switch.
Figure 6B:
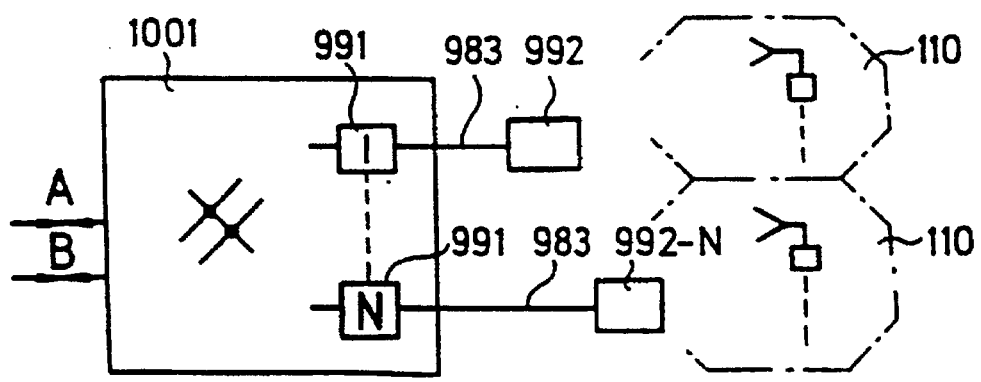
FIG. 6b shows an example of a communication interface between an LFU and an HFU interfaced to and from a switching system.

FIG. 6 shows an embodiment of a system where there is a cooperation through a communication link 40, switching between subsystem internal intermediate couplings through a switching function 900, for other traffic switching and between different connected signals through an external switch function unit 1000. Through said unit 1000, which can be considered as an example of an external network comprising for instance independent "conventional" digital switch or a similar apparatus, there are normally traffic switching of traffic between subsystems or other systems at the same or at other sites. The external switch or corresponding apparatus can also be arranged to provide switching functions corresponding to the function for said schematically shown switching unit 900, which for instance also can be utilized for redundancy, etc., in accordance with what is stated about said unit 900, or if there are lower or more limited requirements on for instance automatic switching in a system which could be arranged through said unit 900. As an alternative other external digital switches can be utilized for providing said switching function 900. In said figure said unit 900 is illustrated as a schematic function for switching information within and between several subsystems. Said figure shows the interaction between two subsystems but also more exist if required. In a complex network comprising several, for instance groups of subsystems, which can interact or generate interference within each group, a switching function 900 is formed for each group. Through the switching function 900 of said CS unit connected signals are switched to and from or between subsystems at demand. Said switching function normally constitutes a switching function which is closely integrated with each subsystem and which can be controlled to interact with other desired subsystems, in cases where said function is implemented. This will provide for instance new fast alternative switching, transfer paths when detecting errors, traffic blocking etc. Said switching function 900 is in other accompanying drawings illustrated in a way showing that for instance a switching between subsystems will occur in a function or a unit which is common to more than one subsystem.

Required functions for digital switching, logical handling of each of the subsystems or group of subsystems can also be considered as integrated with regard to for instance function and unit where basic functions and units included in this description are integrated. In such a case the communication interface between an LFU and an HFU is further described below for example an interface to and from the switching system. This is shown schematically in FIG. 6b.

A switching system 1001 includes within the system thereof completely or partly integrated functions for, for instance, concentration of traffic, logical handling of information with PS units, and also switching between subsystems. The connection to external devices is provided through a transparent communication interface 983 to each HFU. In said figure the system can be considered to comprise one to N subsystems N 1 or more.

Said figures show primarily system implementations where the systems constitute separate extended radio network arrangements which in interaction with existing networks, switching systems, etc., will provide separate systems and units. This is because the method can be described more clearly and that models of this type can be utilized in interaction, for instance as radio access networks with existing systems of different types, and because existing switches at the moment are not provided with the desired functions. This type of system can be regarded as comparatively independent of any suppliers. Another way of describing is to consider the method integrated with a switching system. This is important because digital switching systems normally are based on solutions which are specific to a supplier. FIG. 6 shows schematically an example of an implementation for transparent transmission of connected signals through two subsystems, each of which covers a service area. A digital signal a is to be transferred from or to CS/PS partly or completely. Said signal a is transferred for instance transparently between CS, PS if this is desired. As an alternative only desired fragments of said signal are transferred in dependence of traffic demands, corresponding time frames in PCM multiplexed signals, or cells in asynchronously multiplexed digital signals, etc. When implementing the systems it is in some cases optimal to connect subsystems to digital signals having a substantially higher capacity than required by the applications at the PS units. This applies for instance in a system having CS units connected to CCITT standards in Europe 8,34,155,565 Mbit/s, etc., synchronously or asynchronously multiplexed or corresponding standards in other parts of the world, and where said PS units for instance are provided with a customer interface corresponding to multiples of 64 kbit/s, for instance Basic, Primary ISDN, etc. In such cases a connected signal at each CS unit normally contains information to several PS units. In systems which are connected through an external switching system there can be internal switching within a subsystem or between subsystems, for instance through an external switch 1000 according to FIG. 6. If a customer Q connected in one subsystem 10A through an interface b needs to communicate with another customer in another, the same, or an adjacent service area, said customer being connected under another subsystem 10B through an interface d, this can be done through said switch 1000. Traffic switching is provided for instance through a conventional external switch or other type of traffic switching unit 1000 rather than being incorporated as a part of the system even if it basically is possible to accomplish the same through for instance said switching function 900, if such a function is included. Traffic between applications within a subsystem and between other subsystems is provided through said digital switching function 900. The reason for using a switching function that has to function for, for instance, subsystems operating in parallel is that at demands fulfill any requirements on fast switching and also efficient traffic management within one and the same or adjacent service areas. Normal operator controlled or customer controlled traffic switching within and between subsystems and between systems normally take place through a separate digital switching unit 1000. An external switching unit at a site may constitute a switching function to a plurality of CS units at the same site. At one site it may further function as a switching unit to several subsystems terminating at different sites. In cases where a subsystem is structured in a repeating configuration said switching unit can be utilized for traffic switching. Generally inputs and outputs of the system are applied for transparent transmissions or other transmissions, normally implemented and formed with a standard interface according CCITT synchronous capacity hierarchies including for instance 64 kbit/s, 2,048 and 1,544 Mbit/s. As an alternative lower or higher transmission hierarchies or asynchronous digital signals such as SONET, SDH, asynchronous multiplexing, ATM, etc., are applied. It is therefore possible to switch traffic smoothly within each subsystem, between subsystems or to and from other systems, other digital "switching units" existing on the market.

As a result of the time frame structure of the subsystems being formed in a modular way in a number of equally large time gaps it is possible to handle an efficient modular capacity such as a subamount up to a total radio channel capacity to and from each PS or between CS units. This provides a flexible and cheap implementation for controlling varying digital amounts of traffic flow within or between subsystems. In cases where an external switching function is sufficient in a specific implementation of a system the internal switching function 900 could instead be provided through an external switch. That is, so as to lower the amount of internal complexity of the switching unit 900 in said central stations external standard switching functions (corresponding to a digital switch) are utilized at for instance a central terminating point for internal or external traffic switching within subsystems, between or to and from other systems, see FIG. 9 and FIG. 17. As an alternative such a switching is provided at a location where traffic for several sides terminates in a so called central terminating point CTP. When there are demands for an automatic working, for instance for traffic blocking or other traffic interaction, for instance if a customer connection is intended to be moved to another cell or another sector, has to be automatic between said subsystems or part of said subsystems said internal switching function 900 or a corresponding switching function is utilized.

Figure 7:
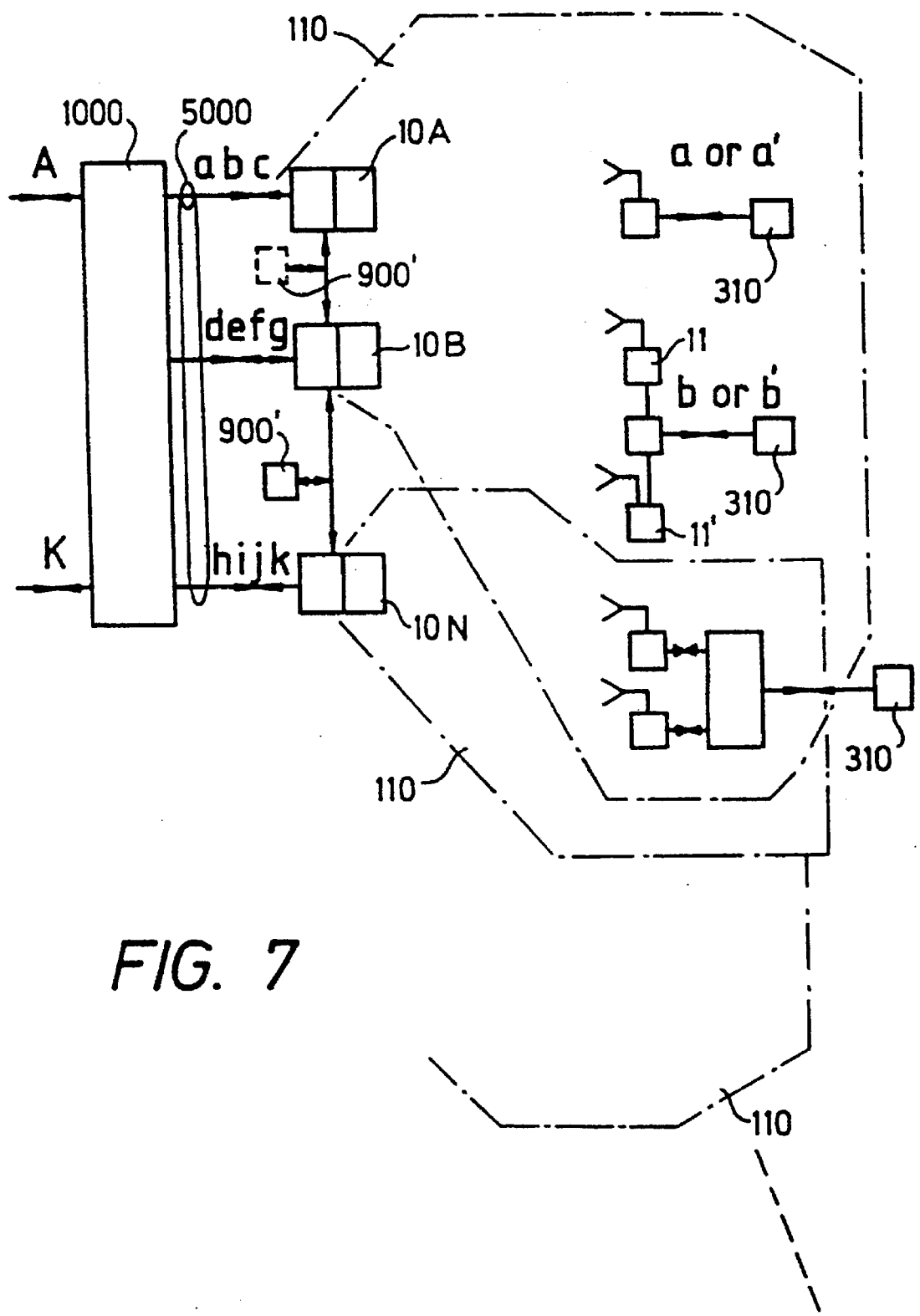
FIG. 7 shows an example of traffic interaction between subsystems, the radio and antenna unit thereof being provided at the same site, and also different embodiments for achieving redundancy PS's.

FIG. 7 shows another example of a schematic structure of several subsystems. At the same site for instance one or several CS units 10A,10B,10N operating at a common frequency band, can interact and handle traffic separately and simultaneously in for instance a so called super central station SCS. The traffic can be terminated in external networks at each SCS. As an alternative the traffic for external networks may be terminated at a central terminating point CTP, which is common to several CS units or SCS units, as described below. Where there are demands on automatic, fast traffic switching, switching of parts of connected signals, etc., the traffic is coordinated through said switching functions 900 when such a function is implemented.

Figure 12:
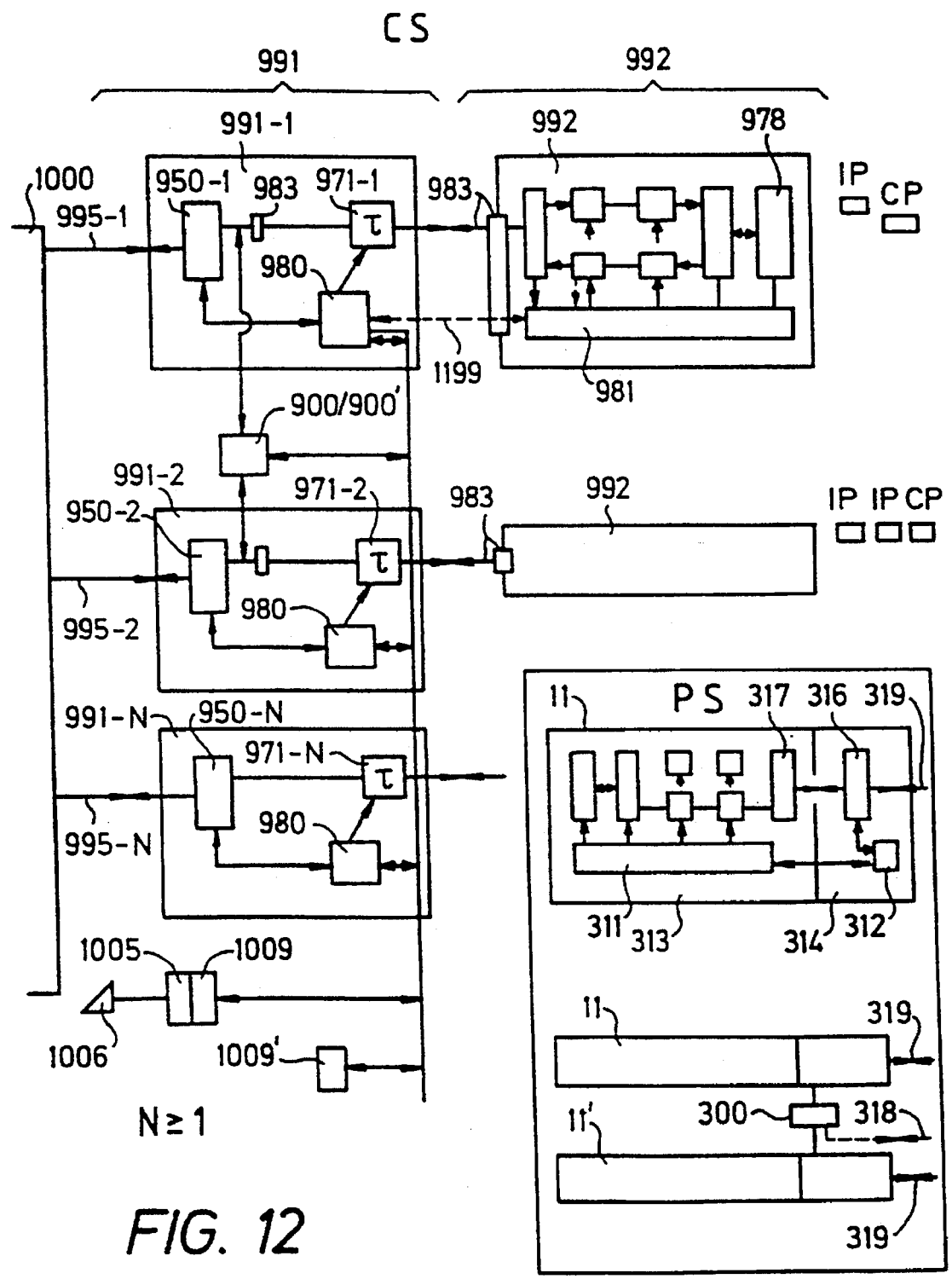
FIG. 12 shows an example of a system structure and modularity for central and peripheral stations, respectively.

FIG. 12 below shows how the structure of a PS will provide interaction on several interface levels.

Figure 8:
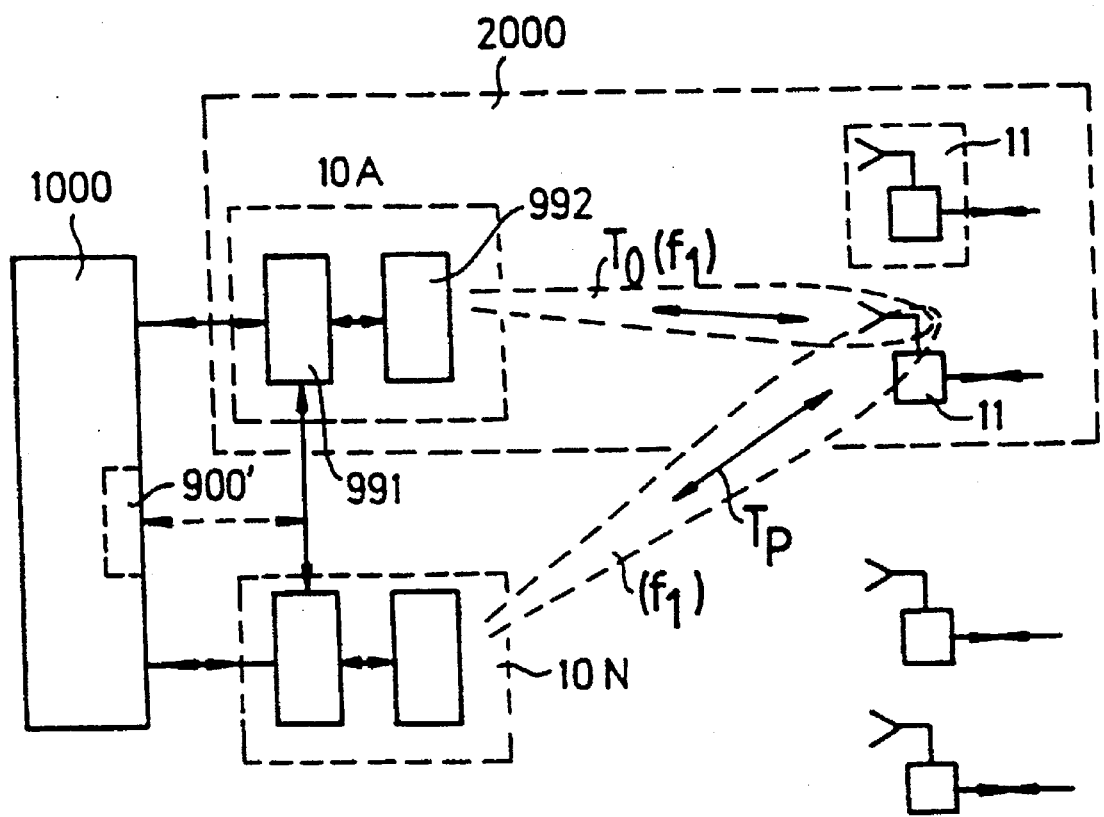
FIG. 8 shows an example of connected digital information which is transferred over the radio system, the subsystem, and shows also that the connected digital information is obtained on an opposite station and forwarded in any desired shape.

FIG. 8 shows schematically another embodiment where communication between subsystems 2000 with a PS exists at the same frequency band during different time periods To, Tp with different CS units 10A and 10N, respectively. A switching function 900' between said subsystems is in this case formed as an integrated part of a switch.

Figure 9:
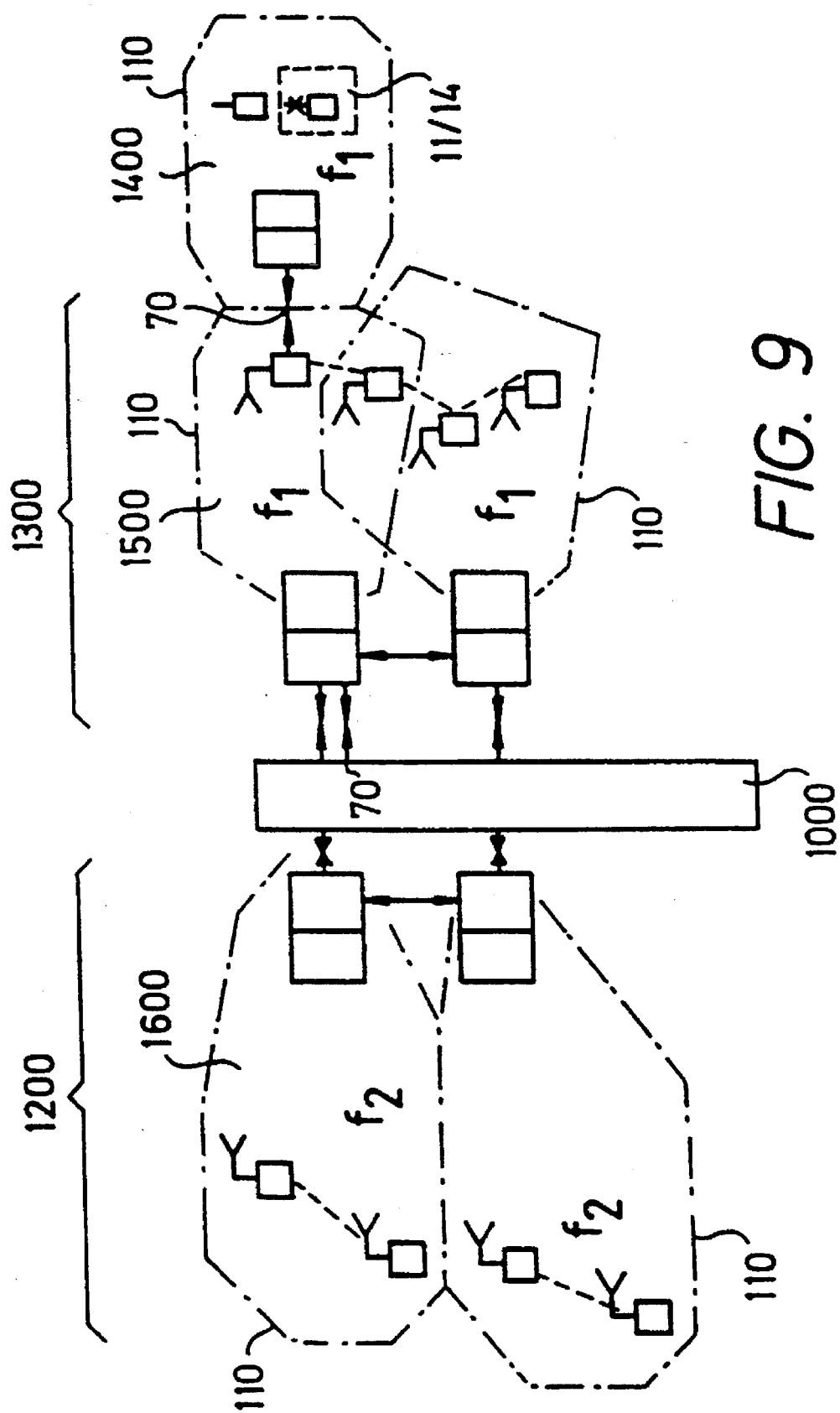
FIG. 9 shows an example of systems arranged as repeaters or another system functioning in an alternative frequency area where these different systems terminate operationally with interfaces of similar structure at a common switch.

FIG. 9 shows examples of further alternative system embodiments and how different systems or subsystems may interact by general interfaces or switches. The example shows how a first system 1200 operating at a frequency f2, and a second system 1300 operating at a specific frequency f1, and a repeating subsystem 1400 operating at f1 can be interconnected, for instance if an extension of the radio covering area is necessary at for instance said frequency f1. It is shown how traffic smoothly can be switched between different systems 1300, 1400, 1200 through for instance a separate switching unit 1000. Traffic in said repeating system 1400 is denoted 70. The example is given so as to illustrate some possible different structures and embodiments of systems and subsystems. Furthermore, the systems may comprise substantially more embodiments, for instance having different radio channel rates, systems for transparently transferring digital signals, systems for mobile applications, possible alternative frequency elections within each subsystem, alternative choice of diversity methods such as polarization multiplexing, an alternative technique of modulation, etc. The modular structure of a CS and also the possibilities of a corresponding structure for a PS provides also an extension of the radio coverage over wide areas while maintaining a terminating point by each new CS being connected to a PS from another subsystem. So called repeating subsystems and other systems having the same and different frequencies may interact in traffic through similar terminating and user interfaces through an external digital switching function 1000. Wide area networks can be created as a result of the structure of said CS units with a separation in a high frequency unit and a low frequency unit.

Figure 21:
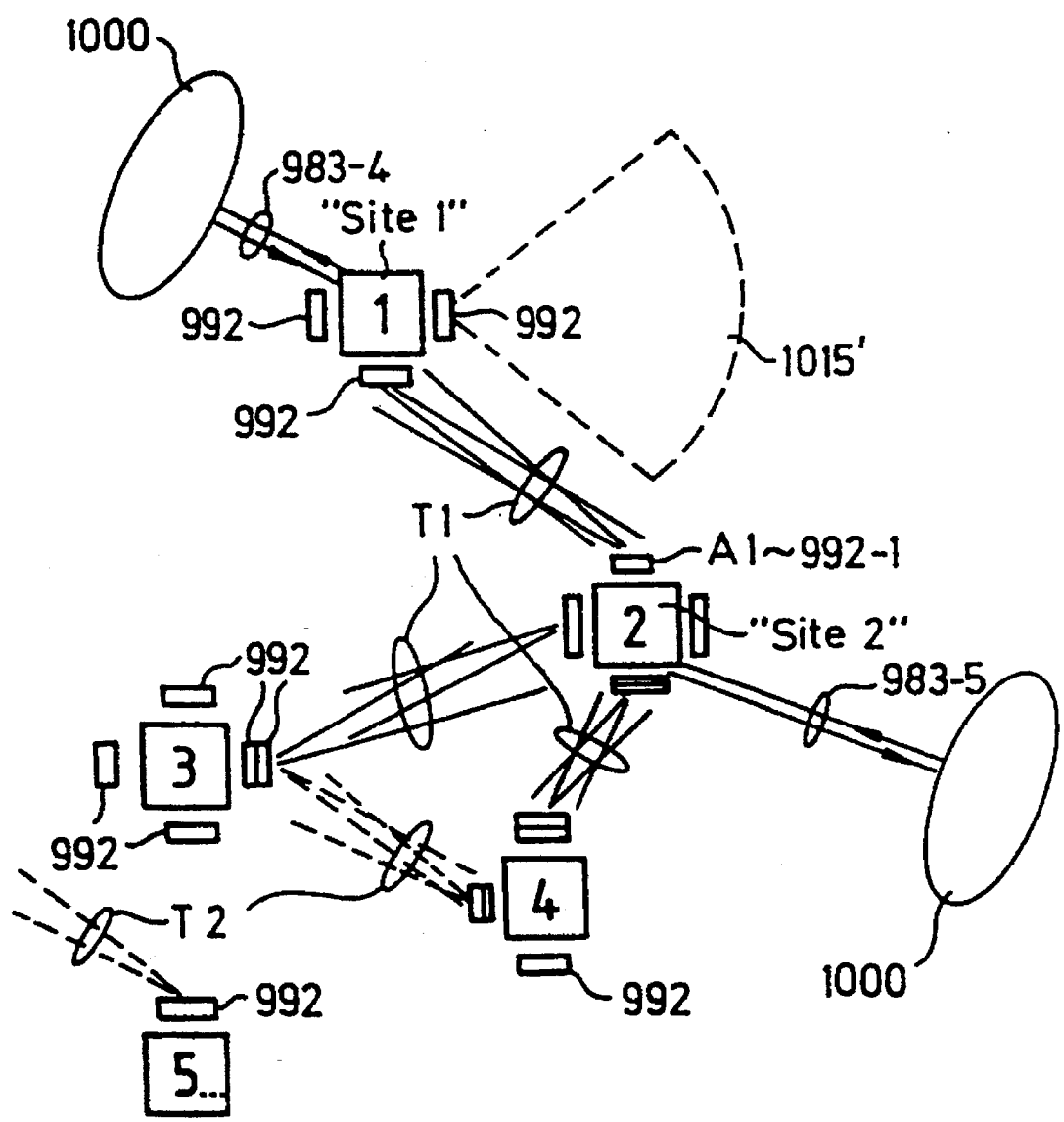
FIG. 21 shows schematically the invention implemented in a combination of systems, one system being arranged for transfer of information between centrals and another system for transfer of information between a CS and a PS.

FIG. 21 shows further examples of different embodiments and the interaction of a radio access network and a connection network.

Figure 10:
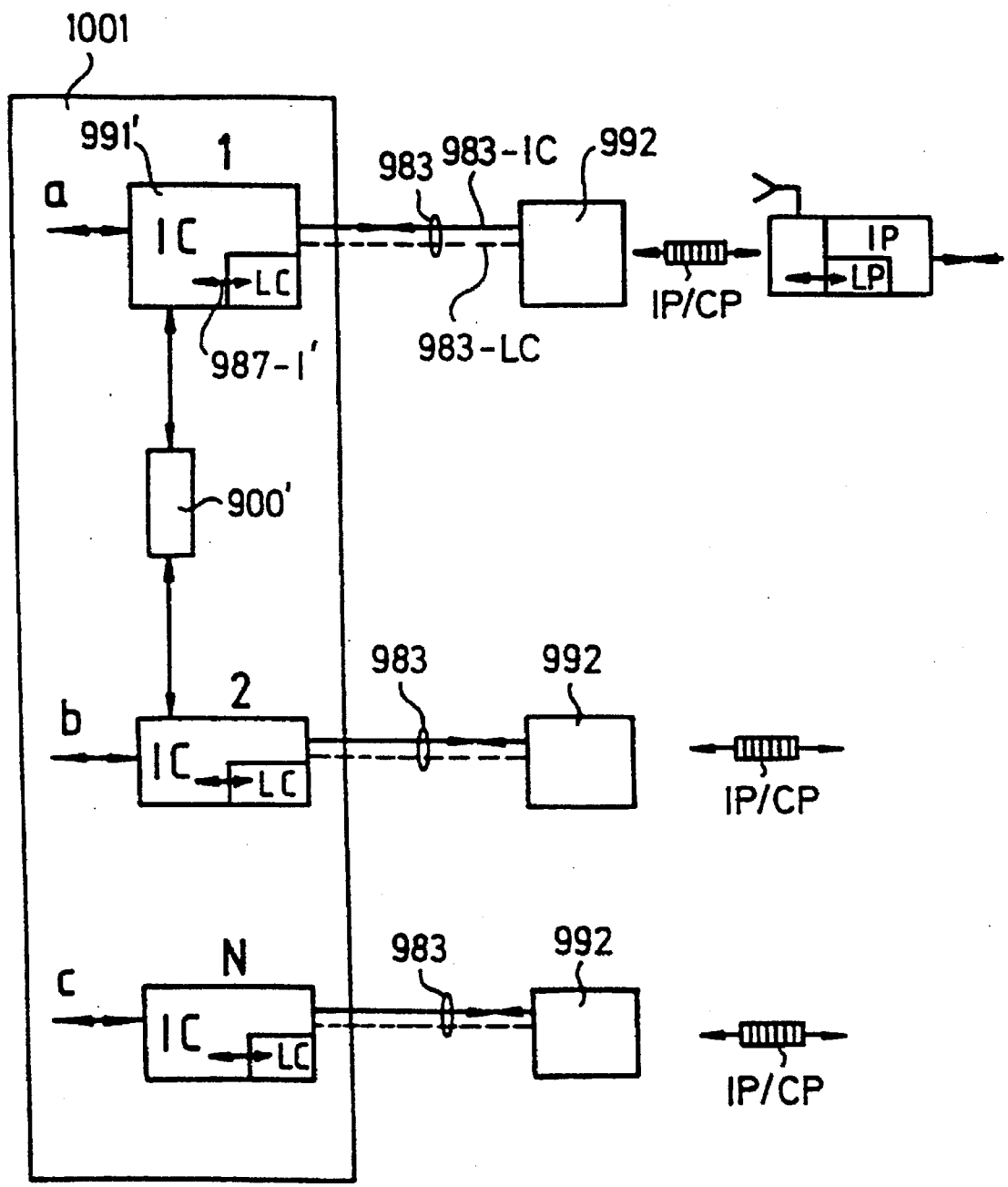
FIG. 10 shows an example of a basic structure of central stations for instance functioning within the game covering area in the same frequency area and also traffic switching between subsystems; also different embodiments of a PS is shown.

FIG. 10 shows as an example subsystems integrated with a switch function. It is shown how previously shown units/functions are integrated into one unit. 991' corresponds to said LFU and provides functions corresponding to the function of 991. IC relates to an interface into subsystems. A communication 987-1' between a logical function LC and LP illustrates the maintenance of control data on a PS, specific distances, time periods, etc. Furthermore, the communication 987-1' from LC illustrates control data for a HFU 992. The handling of information with other PS units through said interface 983 is represented by 983-IC. Information interaction with a HFU is done through 983-LC. It is not necessary to transfer control data for said HFU through the radio system.

Figure 11A:
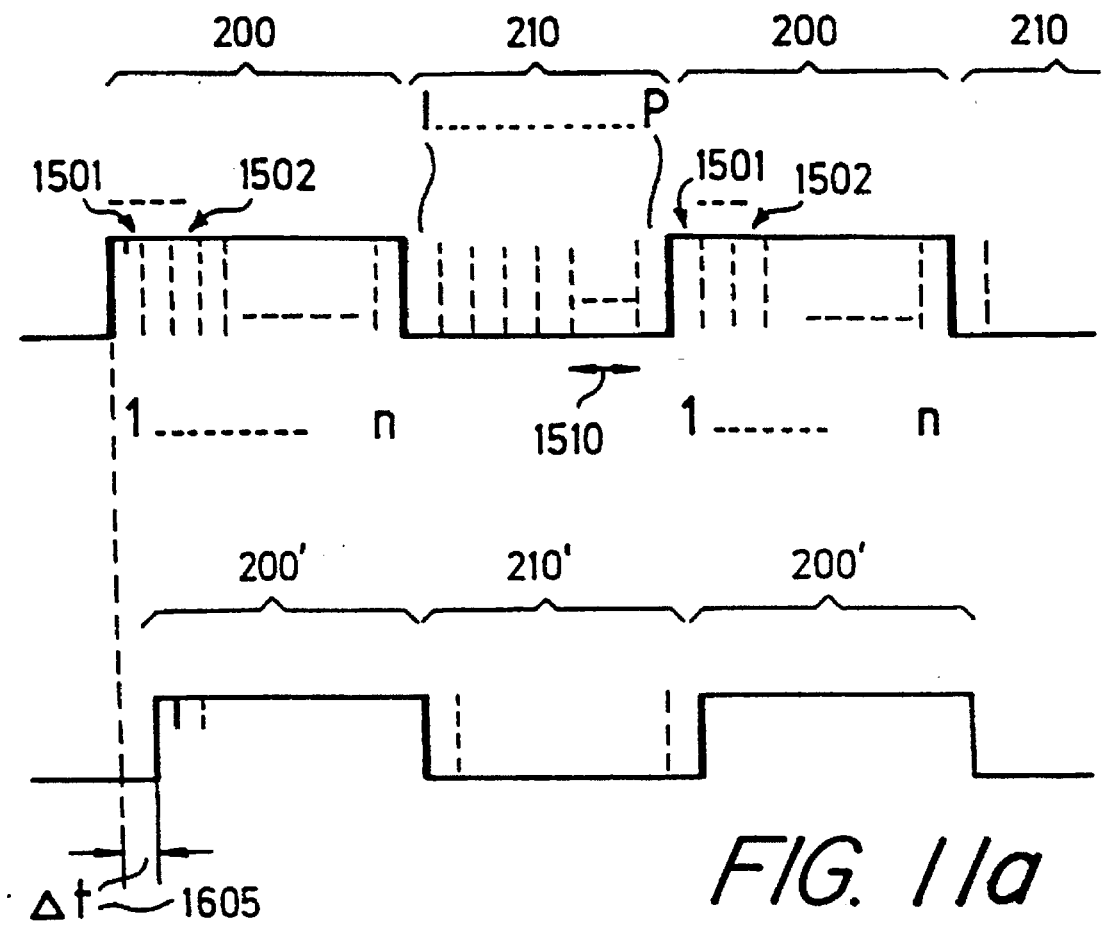
FIG. 11a shows an example of a frame structure for two or more subsystems which are geographically disposed in different positions where they operate frame synchronized at a constant difference between the frame time intervals thereof.

FIG. 11 shows schematically an example of one of several possible time frames for a TDMA time duplex system. The example is shown so as to give a general example of how to form an operating system in time duplex. Systems implemented according to the present method are provided with varying capacity, time sharing, time periods for CSSF and PSSF, respectively, according to actual demands. For two of the subsystems in the example the time frames are formed for time duplex. In the example the transmitting time in each direction has the same magnitude; in the example it is assumed that the traffic volume in both directions has the same magnitude. There could be a difference in capacity in different directions, and the frame structure is chosen in dependence of specific applications, demands on time delay, etc. System having a time duplex structure provides a simple and cheap method of constructing, and a low or insignificant interference, or an interference which cannot be measured, between adjacent CS units when the CSSF, PSSF are synchronized in each of the subsystems. Furthermore, such a system will provide a smooth allocation of frequencies, an economic implementation of a PS, efficient utilization of radio channels in applications having a dynamic traffic, etc. 1 . . . n time gaps are defined under each CSSF, and 1 . . . p, respectively, for each PSSF.

Basically each CS unit communicates with a number of PS units associated thereto. Each CS should be updated, for instance about any authorized PS units existing within the covering area associated thereto, be able to identify new PS units, what traffic that has to be transferred, allocate time gaps for traffic to/from each PS, PS requests and status replies, detect the quality of the transfer. For identifying, continuously synchronizing and controlling each PS unit under each CS unit, a possible example of a system embodiment in time duplex is shown. A time period is allocated in a transmitting frame of a CSSF, said time period being referenced to as 1501. In PS time frames a time period 1510 can be allocated for instance as a response to an identity call. Said time period 1510 varies in each case depending on a predicted interval of distances between a CS and a PS, and also depending on the required frequency of the process of identification. 1510 represents the allocation of a time period for transmitting a reply on an identity call for an appropriate equal adjustment of a constant delay due to varying distances from different PS units to each CS unit. Each PS is time compensated with regard to the varying propagation time between a CS HFU and each PS unit in each subsystem that said unit is communicating with. Normally, the major part of available time is utilized for transferring traffic (Information Packages IP that is user data), or other control information (Control Information Packages, CP, that is system signaling). Transferred packages that contain information and control data, respectively, are separated among other things due to different requirements on the transfer and detection of information, and also actions based on the contents of each of the types of packages. A CP has to be rapidly read and detected with respect to quality. 1501 is an example of a time period utilized for synchronizing information and/or control. When synchronizing it is also possible to utilize a bit synchronizing information applied to any transferred package. 1502 represents a time period for an identity transmission call to PS units of other stations. Said time periods 1501, 1502 can also be provided in a common time gap or a common time interval, and the example shows a possible system structure. In one and the same SCS a time difference 1605 between time frames of different subsystems basically becomes "zero" as a result of a frame synchronization. The basic synchronization between subsystems not located at the same site but possibly interfering is provided by coordinating said subsystems to minimize this time period. If the average distance between CS units that might interfere with each other is for instance 20–30 km said overlapping time period should be lower than approximately 1000 ns. If for instance time frames have an extension of 1–2 ms both for transmitting and for receiving the probable loss due to interferences will be limited. Also other combinations or frame times are possible. It is for instance possible to apply a dynamically varying length of the time frames in each subsystem according to a specific traffic demand in time or according to other methods in dependence of variations of traffic flow in different applications and system embodiments. All mentioned time periods, intervals and positions, etc., for the time frames are only examples. Several different embodiments are possible in different system structures.

Figure 11B:
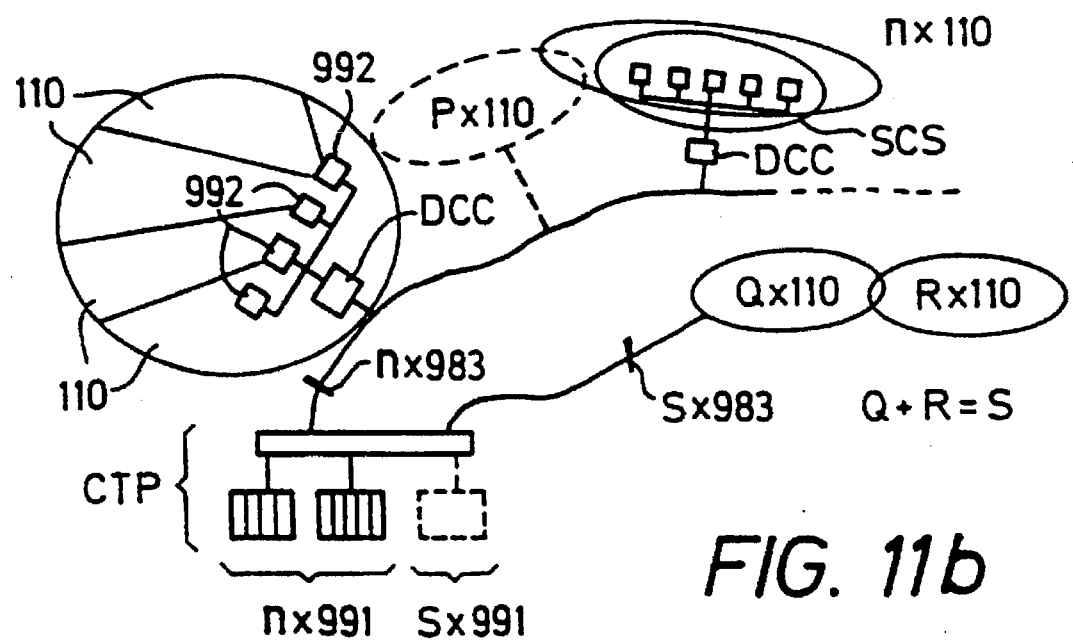
FIG. 11b shows a system according to the present method.

FIG. 11*b* shows further advantages by constructing a system according to the present method. The overlapping time 1605 between different subsystems, see FIG. 11, should in a time duplex application be as small as possible, at least for subsystems that may risk to generate radio interference with each other. As to CS units at the same site SCS this is readily overcome by frame synchronization. When applying the method in a case where several SCS units terminate at a common point this could also be efficiently coordinated and compensated for at the CTP. This is a further advantage with the structure method and separation in LFU/HFU. SCS's located at different distances from each other are adapted by a time delay for decreasing the overlapping between subsystems possibly interfering with each other, in cases where it is desirable. This could be achieved by connecting varying delay functions for each CS, CSC to compensate for differences in propagation time to have an adaptation for different actual HFU units for evening up relative differences of propagation time. That is, specific HFU units can irrespective of the distance to LFU unit be regarded as located at "the same" distance.

FIG. 11*b* shows an example where a fiber network is utilized as a transporting network to a plurality of spread out HFU units, each of which covering one service area. DCC stands for Digital Cross Connect. In the shown embodiment the shown subsystems terminate in a central terminating point CTP. Furthermore, it is shown how groups of HFU units constitute SCS's at common sites. The examples of the description show time duplex systems. A number of advantages exist with time duplex. The time interval for each CSSF and PSSF can be optimized and made short so as to compensate for a delay and any required intermediate storing capacity. The frame structure could for instance be provided with only one or a few number of time frames, etc.

A disadvantage with time duplex as compared to frequency duplex, is that the transmission speed in a radio channel is divided between two directions resulting in switching losses, etc. Mother disadvantage is that larger memories for buffering purposes and intermediate storing are required, for instance on the HFU, and also resulting therefrom a time delay.

When applied in system embodiments implementing systems for distribution of digital system flows according to principles of ATM, or systems mostly integrated or connected to ATM switches having an asynchronous multiplexing or a similar switch, or transmission system, such as SONET, SDH, MAN; DQDB, etc., or similar to CCITT, ISO, IEEE, etc., standard transmission systems, embodiments operating in frequency duplex will provide a decrease of transmission delay. Systems constructed in CDMA technique or in combinations with TDMA having narrow band modulated signals in frequency steps are formed for instance with utilizing one or several time gaps for a time frame according to time duplex or frequency duplex. As an alternative a varying adaptive time interval length is applied for time gaps or frame according to any application or any demands. For instance in sporadic data traffic the method may provide flexibility and a sufficient quality. Each application will have different requirements on each system. The available system capacity in time duplex is determined either to provide at each set up of data transfer for a user a two way connection between a CS and a PS which could be compared to a circuit coupling in a telephone system. As an alternative there is allocated individually to each direction, in a time frame under 200 and 210, respectively, a time gap with regard to the actual traffic needs. When allocating transmission resources in a subsystem according to demands for a CS-PS and a PS-CS, respectively, in any direction in principle potentially more information can be transferred over the system, if "silent" switching trains can be utilized by others. The time gap allocation is controlled and coordinated from a CS through a CP signaling any required information to each PS. Basically each PS will have almost a slave function under a CS. This means that each PS will receive information about which time gaps to be used and for what purposes. Through the signal channel CP a PS also informs a CS the traffic needs existing at present, which time gaps that are used at present and by whom, status, etc. Through a signaling between each subsystem or CS, PS any PS is controlled, coordinated and supervised with regard to quality by the CS. In dependence on the application, the quality requirements for each IP, etc., codes possibly applied to the information are decoded. When errors in the transmission are detected there is for instance a change of time interval, diversity measure, frequency exchange. As an alternative there is an exchange of CS through a signal connection at a CTP between actual LFU units for actual stations. When subsystems cover adjacent service areas and terminate in a CTP it is possible to move a PS to alternative service areas or CS, for instance when there is an interference from other sources, etc.

To provide a fast transparent setting up of connected signals and to minimize the signal capacity specific station parameters are stored at each PS. In the cases where a fast traffic setup is required, for instance dynamically speech controlled setups of a new time gap, there is a pre-reservation of time, including error analyzes of pre-reserved capacity. Actual data are updated and corrected afterwards when conditions have changed. Any actual traffic data, allocating of resources, etc., are stored intermediately and updated continuously in intervals in each PS. Using low rate intervals to optimize the minimization of signal capacity and to maximize the stability connected PS stations can continuously be requested and updated by a CS. This means that several PS units can be connected in a passive way without utilizing more than a fragment of the capacity of the subsystems. If for instance a subsystem has hundreds of time gaps available one or a few of them can be utilized for thousands of PS units which are connected in a passive way. Any actual transmission demands varying in time are detected, and new time gaps are allocated if any free gaps exist or in dependence of another priority. If there is no time available in a subsystem an alternative transmission path can be chosen if for instance a spare CS is connected.

FIG. 12 shows an example of a basic structure with a plurality of subsystems, 1 ... N of equal type which are implemented in a modular way in a system according to the invention. Reference is first made to a subsystem 1. Said system is drawn as a radio network that reserves capacity for the transfer of user information to any chosen station through so called normally unconcentrated connections 995-1, which are analyzed by a traffic dynamic function 950-1 and by means of a logical function 980. A schematic function for a HFU 971-1 is shown for varying distances for coordination. The central parts of a subsystem are interface and terminating functions 950, a low frequency unit 991, a high frequency unit 992, and whenever applicable a transparent transmission link 983 between said low frequency unit and said high frequency unit. Furthermore, at demands there is also a specific switching function 900–900' between subsystems for redundancy, etc. 900' indicates that said function is integrated, for instance with an external switch or is incorporated in a switching system.

A block diagram is shown for a HFU unit. At the left side of said unit there is shown outgoing or incoming radio-based communication to an actual subsystem, a transfer of user data IP, and signaling CP between CS and other stations. There is shown a PS 11 and a redundant configuration of PS units 11/11' having a modular structure which is basically similar to the structure of a CS. However, most of the modules for a PS have other functions. Also other embodiments than shown of a PS can exist in dependence of the application. In a CS 950 corresponds to 316 in a PS, HFU in CS by 991 in a PS 313. Said PS includes logical functions 312 communicating with said logical function 980 of said CS. 311 refers to a control and supervision of the control function of a PS. 319 refers to a PS interface towards a user application. In one embodiment there is shown for instance how the modular structure can be utilized to make also two peripheral stations, for instance separated physically in a low frequency unit LFU and a high frequency unit HFU, interact traffically through a switching unit 300, or operate redundant in relation to each other. Digital signals 995-1 .. . N into and out of each subsystem or system comprises synchronously or asynchronously multiplexed digital or other types of asynchronous/synchronous digital standardized flows of information, normally in digital form. The example shows the interaction with an external communication system 1000. As an alternative the radio communication system comprises, as shown above a unit 1001 integrated with a switching system. External switching functions are for instance conventional digital switches intended for fixed or mobile traffic, switches according to ATM type, packet data switches, for instance according to X.25, or similar, or Routers, Brouters, Bridges, etc., for data networks etc. External systems are applied for instance for transparent access networks. Integrated systems having a switching system could for instance be mobile communications networks. Time and space control is for instance applied to networks such as GSM, narrow band digital TDMA systems in USA, or corresponding systems in Japan.

A PS without redundant functions comprises according to the present modular structure a HFU unit 311, a LFU Unit 317, and an interface and customer terminating unit 316. The example shows a system where each unit 300 also could interact traffically with a common interface unit 318 or that they operate for instance in redundancy through each other through their regular interfaces. As an alternative each PS unit is formed as a station without said redundant parallel coupling. Interaction between PS units is done in a digital level so as to keep low the costs and provide flexibility. Through for instance standardized interfaces 319 toward external units also traffic switching can be done through external switching functions similar to a CS. In for instance a case where a peripheral station is to be utilized for fixed traffic in a system of general telecommunication traffic a similar structure can advantageously be applied for the peripheral station. In a case where the system is implemented for mobile applications, terminals carried by a person, etc., or other applications where a compact design is required and the physical structure, etc., is completely different, said peripheral station can have another structure so as to fit to such an application. The peripheral station is provided with different levels of independency according to different requirements of the applications. Normally there is an allocation of resources at the CS because then the PS unit can have a logically simple structure and be substantially controlled by the CS. The storing of required control information for incoming and outgoing traffic data, for compensating distances, the CS address, addresses, status, etc., is done at the PS. Furthermore, functions for alternative antenna directions towards different CS units, alternative polarizations, alternative frequencies, or an actual sequence of frequency steps, etc., can be included in different systems if required.

To create a flexibility to different applications standardized international number series for users and/or stations are used. It should be possible to change in a flexible way identities in the system. Applications of so called smart cards on for instance the PS will make it easy for the users to define in a flexible way alternative users on a common hardware. One or several subsystems can when required be coordinated, configured, etc., through common functions 1005,1006. It should also be possible to include remote connections. In cases of for instance cellular applications it is sometimes interesting to measure the volume of traffic flows through the radio network for debiting purposes.

Figure 13A:
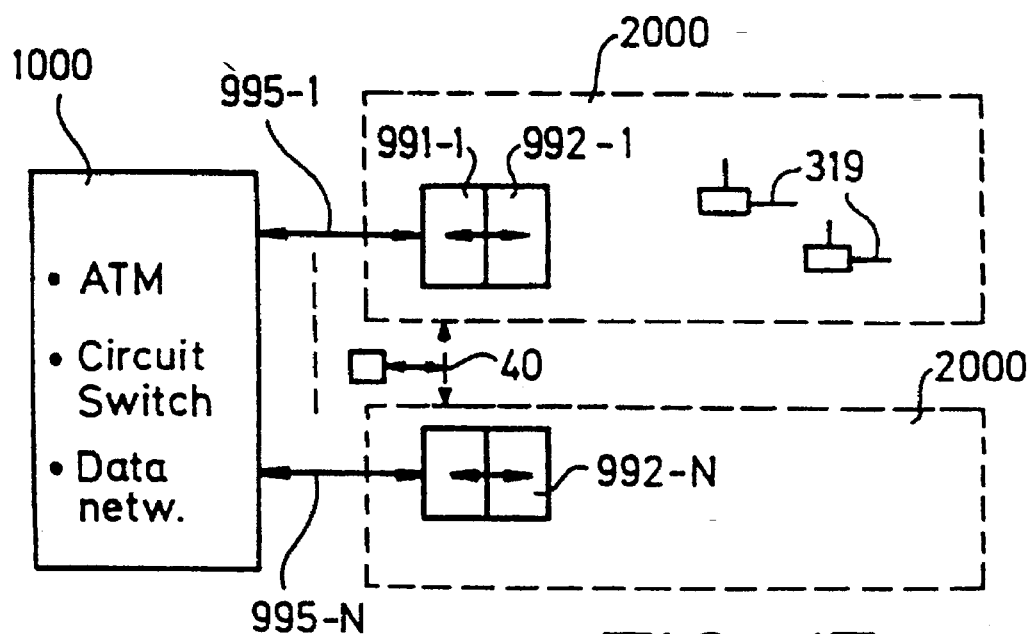
FIG. 13a shows an example of an interface structure between a high frequency unit and a low frequency unit of the subsystems.
Figure 13B:
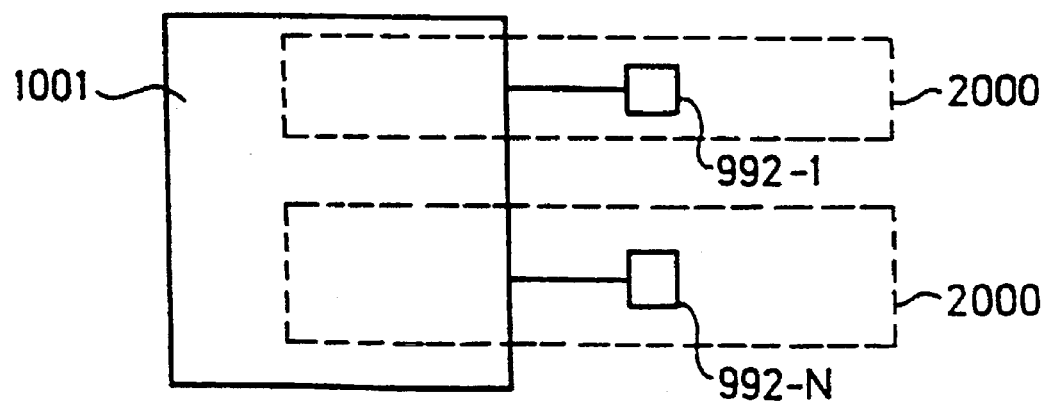
FIG. 13b shows an example of an integration of a common communication channel for several subsystems between a high frequency unit a low frequency unit.

FIG. 13 shows schematically a system configuration having a signal interface 995-1 . . . N where the system basically can operate as a separate network for other external networks of a type for transferring connections for, for instance, conventional synchronously multiplexed signals or asynchronously multiplexed signals, or HDLC type of data.

In this case the connection signals normally have a total transmission capacity exceeding the capacity of the radio system. In for instance a dynamic traffic allocation the actual traffic data is applied to be transferred through the system. In these cases normally each PS has a signal interface 319, the capacity thereof being substantially lower than the transmission capacity for the signal in said interface 995-1 . . . N of said CS unit, for instance 64, 384, 1,544, 2,048 Mbit/s, etc., or a higher or a lower transmission capacity.

It is also possible to apply the system structure with a function for applying information from data networks with an interactive duration, capacity, etc., for packeting at 991 to time gaps of the system for a transfer in system shape, and then recreation at a PS in any desired shape.

FIG. 14 shows schematically a few of a plurality of possible cases of interference between subsystems that should be considered. If the side lobes of an antenna system are 20 db lower than the main lobe there is normally obtained approximately a 20 db higher wanted signal compared to a not wanted signal from another subsystem. Normally the effect is higher because two directed antennas are used. If the system in the example transmits in time duplex the interference to the receivers during transmission is negligible for the same or adjacent sites when there is a frame synchronization. By an appropriate election of the modulating and demodulating method, for instance PSK, MSK, QAM, Slip-Code, "Spread Spectrum" having for instance coded channels, CDMA, etc., in the shown system embodiment and digital transmission it is thereby possible to achieve a parallel operation of more than one subsystem operating at the same site and basically covering the same area. The receiving at a CS is expected to be more sensitive to interference as a total than at a PS because a CS normally will be disposed comparatively "high" and also because the traffic converges there. To minimize interference between "packages", for instance through the either to/from different subsystems, such as a PS or a CS, the energy level normally is controlled in each subsystem either to a fixed value for a cell/sector or dynamically or optionally adaptively according to quality demands. Systems can be provided with a dynamic control of the energy level from a CS towards associated PS units. As an alternative the radio energy level of a cell or sector is controlled to a constant value individually to each cell or sector in a cell pattern which is covered in a more complex way with many cells covering a larger area because in some cases there will be only minor effects of an increasing capacity in total with a dynamic power control on a time gap level from a CS. Corresponding facts apply for PS units; see the example of 14b.

PS traffic in a subsystem 3010 might interfere with PS traffic in another subsystem 3012. Traffic to/from a PS 3000 might for instance interfere with traffic to another PS 3001. The pay signals are adapted to a level in the example. If the distance to said unit 3000 is much shorter than the level of the pay signal transmitted for said PS unit 3000 lower than the pay signal for said PS unit 3001. The result is less interference 3050. However, the risk of disturbance by interference from a second subsystem increases in 3000 if the energy level is higher for 3001. However, there is an adaptation and minimization in total of the total energy that might interfere within the system or with other systems. Furthermore, the "cell configurations" can dynamically be adapted when the traffic capacity increases. That is when establishing a radio network initially the requirements of the customer could be to cover wide areas. When new subsystems are applied later on and implemented successively then for instance the radio power of each subsystem could be lowered considering the new conditions.

Figure 14A:
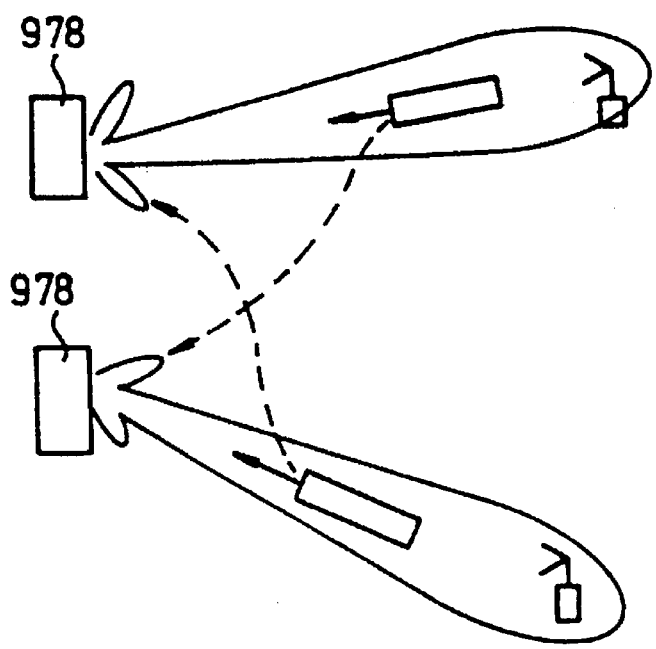
FIG. 14a shows an example of a system arranged for transparent digital flows according to an asynchronous digital multiplexing according to ADT or ATM.
Figure 14B:
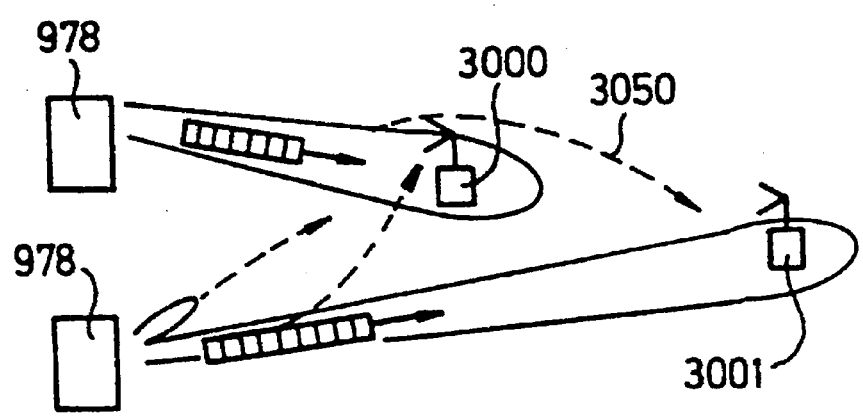
FIG. 14b shows some of a plurality of possible typical interference cases between subsystems in an application of CS units at the same site.

FIGS. 14 and 14b show some of a plurality of possible typical interference cases between subsystems in an application of the CS units at the same site. Two of the subsystems are considered to cover basically the same geographic service area. FIG. 14a shows antenna systems of two different subsystems, for instance operating within the same frequency band. "Information packages" in a time gap associated to each system will arrive basically simultaneously to subsystems at the same "site" if the same time gap is used. Interference risks are calculated in advance for fixed PS applications when considering time gap when for instance the same frequency band is used. Different sizes of time gaps in different subsystems would also affect the interference between different subsystems.

FIG. 14b shows how interference 3050 can occur between subsystems at the PS receivers. Two PS units at different distances in different subsystems can interfere. An adjustment of the energy level or said two subsystems can be made considering that a deteriorating influence should be minimized to obtain an acceptable transmission quality. It is possible to calculate in advance that a direct signal to a PS 3000 might interfere with the signal to a PS 3001, if the same time period is chosen for said stations. This could be avoided either adaptively by correction or in advance. In fixed system applications the geographic positions are fixed and it is therefore possible to utilize a known geographic pattern to predict an interference risk and then avoid or make a correction by choosing appropriate measures such as changes of time periods, of polarization, etc.

The effects from for instance side lobes, etc., are more difficult to predict, and interferences that cannot be predicted can be corrected adaptively by changing time, power, polarization, etc., when errors have been detected. Also previously obtained information about interferences can be utilized. It is for instance possible that the system learns that in a certain position an interference source is located and thereby avoiding that direction during any time period of interference. The adaptive control means that the antenna specification for a CS antenna does not have to be extreme with regard to directivity when the modulation, etc., is chosen appropriately, and the levels of the side lobes coordinated therewith for obtaining an acceptable transmission quality is sufficient in most telecommunication services.

Figure 15:
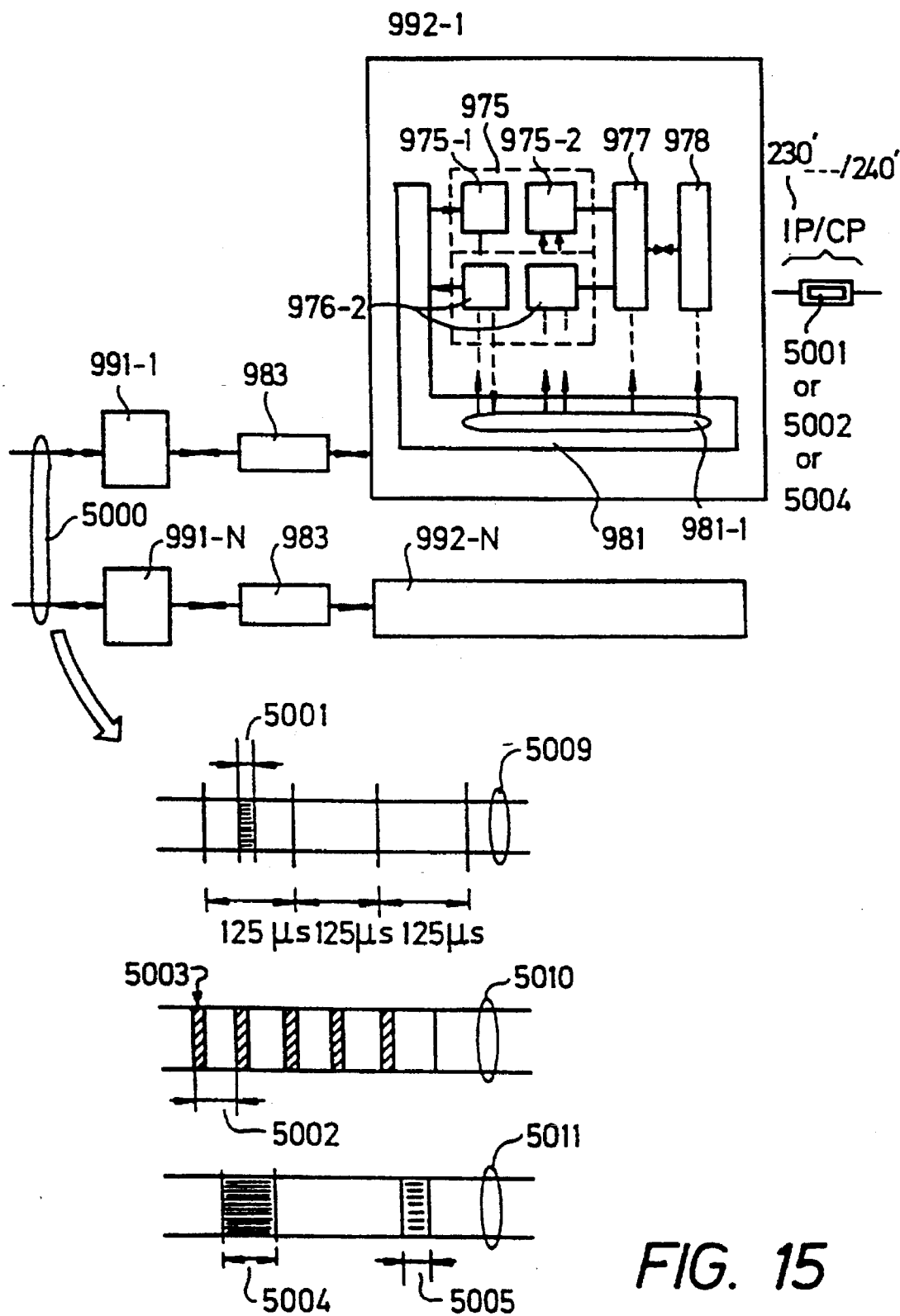
FIG. 15 shows an example of a basic embodiment of a subsystem.

FIG. 15 shows an example of a basic system in a system which is separated from another network. The flow of information for, for instance, asynchronously multiplexed signals 5010 is applied in a system embodiment. A cell is denoted 5001, a header is denoted 5003, and a field of information is denoted 5002. To illustrate an application with synchronous multiplexing such a system is indicated at 5009. In frequency duplex the HFU unit is provided with a filter 977, and in time duplex there is a switching between transmitting time and receiving time. In the example the HFU basically can be arranged to operate at one or several pairs of frequency or one or more frequencies in dependence on a specific embodiment. One or several cells or parts of cells are applied to packages of information of said subsystem in dependence on the actual capacity Of the radio system. Corresponding facts apply for synchronously multiplexed digital signals, that is fragments 5001 of time gaps for a connected signal are applied to one or a combination of time gaps which are applied to information packages.

An asynchronous, unmultiplexed signal having for instance an amount of information 5004, 5005 varying in time is illustrated as another example, 5011.

FIG. 15 also shows schematically a block diagram of a HFU 992-1 for a subsystem. As previously mentioned a HFU can include common functions for several subsystems, for instance for a SCS. The information from logical function of a LHU applies control data to the HFU through input multiplexing of control data on a transparent digital flow of bits 983 that is transferred in parallel with user data from 995, which is to be transferred to a PS. In a control unit 981 the HFU control data will be picked out and used for control signaling for timing, direction or other control at said HFU. In said subsystem said HFU 992-1 comprises a control unit 981, and a modulating unit 975-1 and a radio transmitting unit 975-2. There is included also a demodulating unit 976-1, and a receiving unit 976-2. The basic difference between frequency duplex and time duplex is defined by a unit 977. In the first case said unit is constituted by a duplex filter and in the second case said unit is constituted by a unit switching between a transmitting mode and a receiving mode. Said control unit 981 is also formed differently in accordance with the differences between duplex and time duplex. Further differences are that in time duplex there is a higher degree of intermediate storing between transmitting mode and receiving mode at the HFU. Through control unit 981 there is a control of the transmitting and receiving in the either. Said unit receives in turn information from the respective or associated system logical function of the subsystem positioned in 991. It is also possible to provide a completely decentralized embodiment having for instance a subsystem logic with or without coordination with other sites at each site. Control signals of the example are shown schematically at 981-1. The direction controlled antenna system 978 is controlled to an intended direction during some period of time. The arrows pointing upwardly at 981 relate to control signals for transmission of data into or out of said subsystem. One arrow is pointing downwardly after being detected in said demodulator. Said arrow symbolizes control information from PS unit that is directly utilized at said HFU in cases where such a unit is applied. In embodiments having equal TDMA time gaps information transmitted and received through the either and through a HFU can be constituted by a certain amount of digital information. Between each time gap, time is normally reserved so as to provide redirection of the antenna. The information in the either is constituted, besides of the original information 5001, for instance if a cell represents a time gap, of a certain amount of extra information for the radio system for synchronizing and similar information, such as a specific radio protocol 230 which may be different for each system embodiment depending on the application. If for instance ATM is used the user information transferred in the either as a package can be constituted by a cell, several cells, or parts of a cell depending on specific requirements on for instance time delay, etc. Said HFU can also be arranged to control one or several radio channels or antenna systems or modems or switches. That is, one or several radio carriers might be active and also one or several antenna systems in different directions for one or a group of subsystems.

Figure 16:
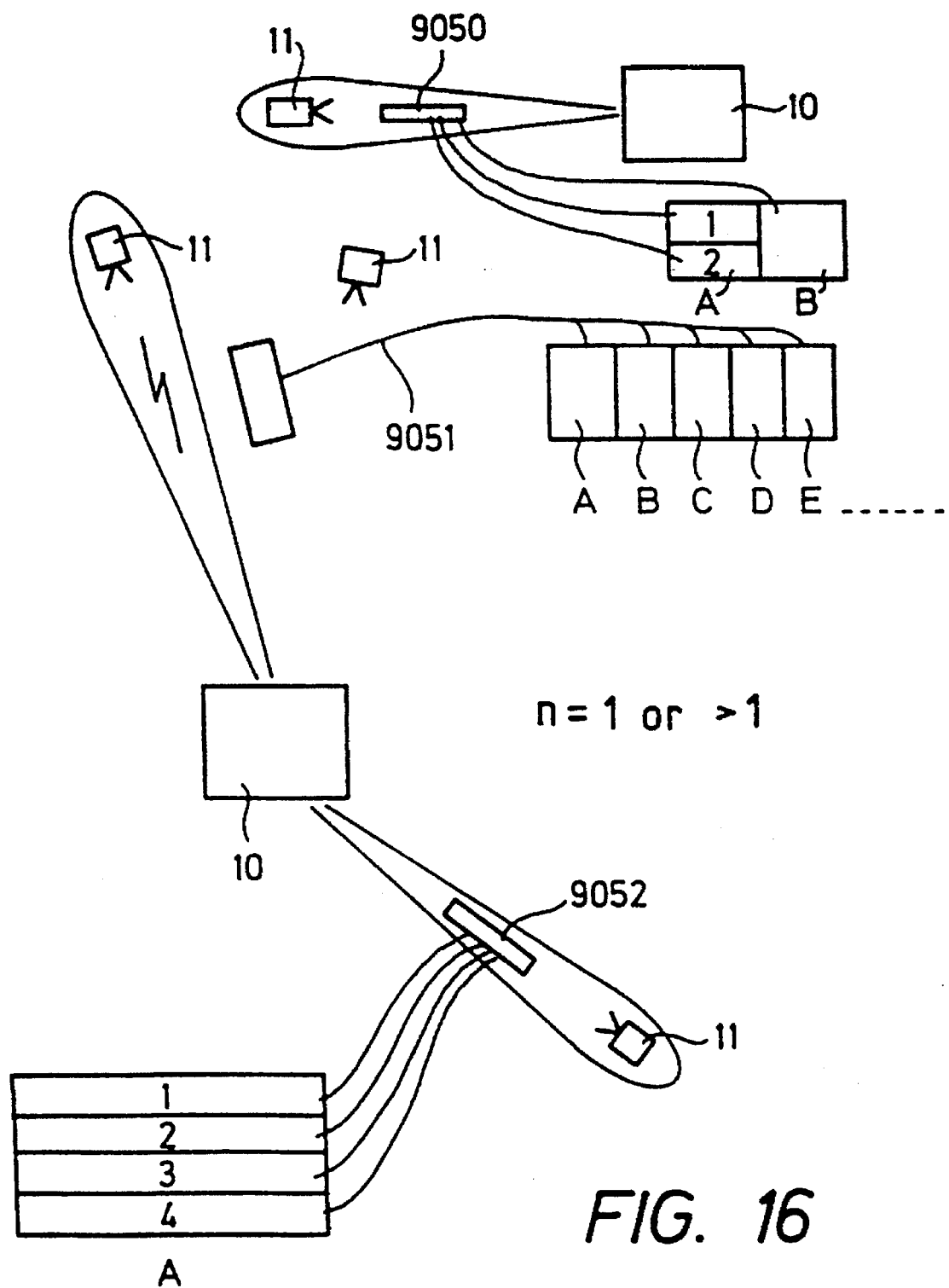
FIG. 16 shows an example of different types and codes of modulation in a radio channel.

FIG. 16 shows some further examples among a plurality of possible examples of a radio channel comprising a plurality of parallel multiplexed signals 9051. Furthermore, a radio channel can be constituted by combinations of parallel and coded signals at the same frequency band 9050. A can be considered to represent coded parallel signals and B uncoded. At the bottommost part of said figure it is shown how the radio channel can comprise coded wide band channels, such as "spread spectrum" with a separation of channels by coding CDMA 1.

Figure 17A:
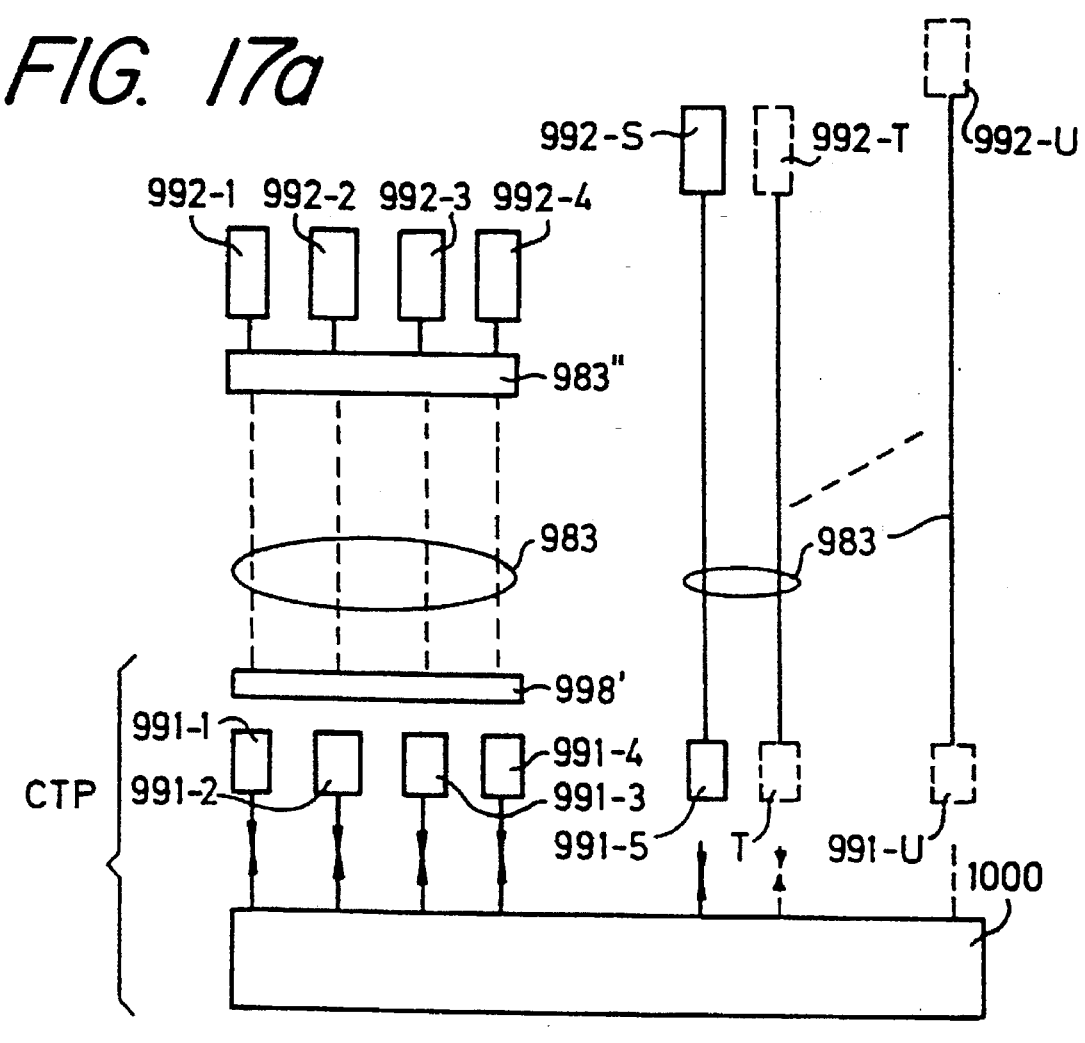
FIG. 17a shows an example of a physical implementation of a plurality of geographically spread out high frequency units and also how corresponding low frequency units terminate in a common central terminating point (CTP)

FIG. 17 shows examples of physical implementations of CS units. It is clear that the method provides a flexible and powerful interaction between systems that are implemented according to the method and other networks. There is an integration with other wide band networks, such as fiber, to provide a wide area coverage. A common communication interface is established to several subsystems if required.

Figure 17B:
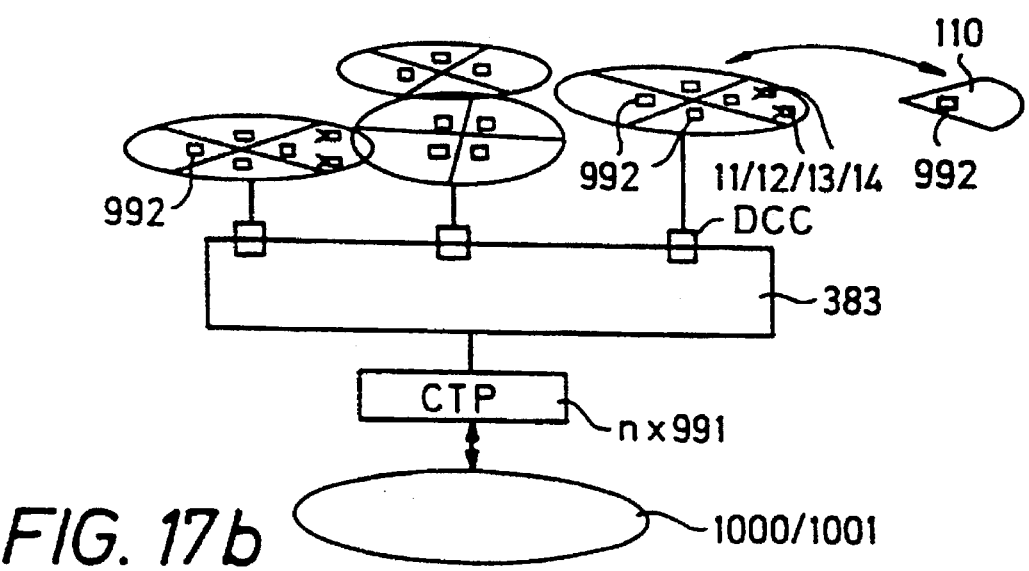
FIG. 17b shows several SCS's.

FIG. 17b shows several SCS's. All HFU units terminate through some kind of transparent communication network to a CTP. The structure is provided in a modular and flexible way in steps when implementing new sectors or cells, each of which creating a new service area 110. A logical integration to and from other networks is done through 1000/1001.

Figure 18A:
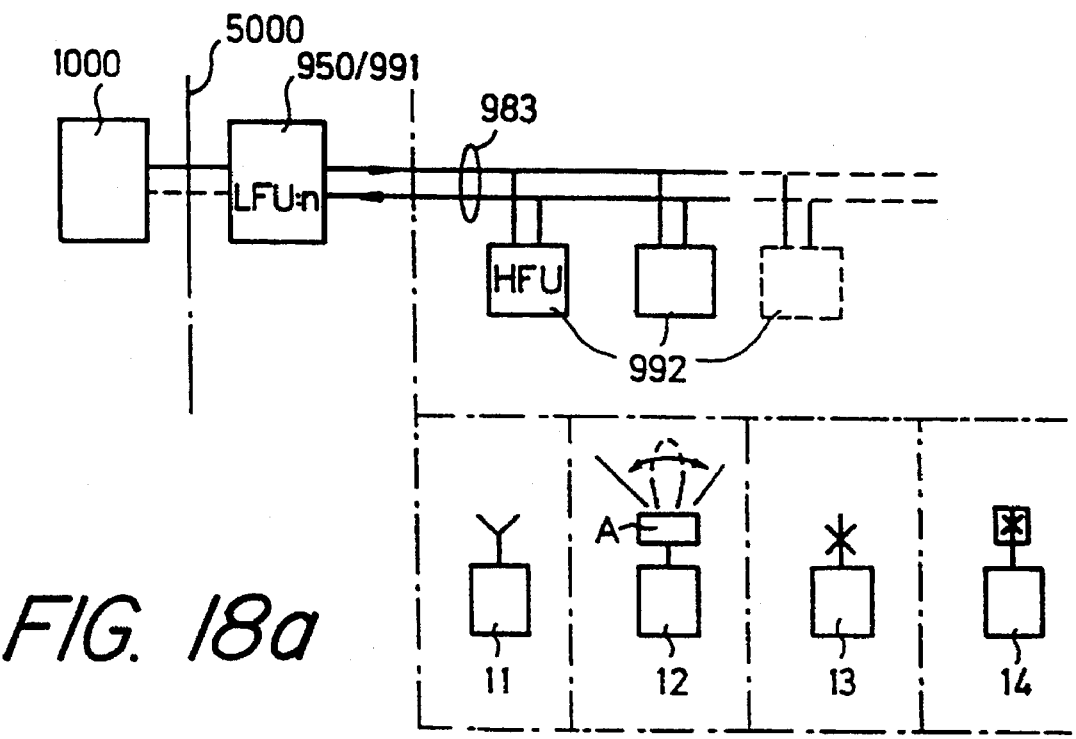
FIG. 18a shows an example of the basic structure of a CS system and also an integrated interaction with other networks having separated high frequency units and low frequency units, and also that basically different types of peripheral stations can be utilized with different antenna systems in different applications.
Figure 18B:
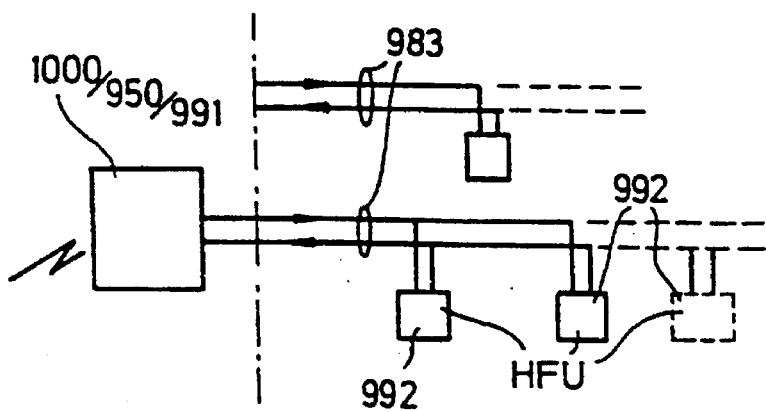
FIG. 18b shows an example of a second embodiment of a CS, wherein said CS with regard to the function thereof is included in or integrated with a digital switching system.

FIGS. 18 and 18*b* show the modular structure in another way. It is illustrated that different types of PS units having different antenna systems can exist. One PS 11 is in one embodiment constituted by a fixed directed antenna. Another PS 12 comprises an antenna system which is directable within a sector/cell or corresponding area. The antenna can be directed towards any chosen CS or chosen CSs. A PS 13 comprises an omni-direction antenna. A PS 14 comprises a PS antenna system which during different time periods can generate a varying width of the antenna lobe.

Figure 19:
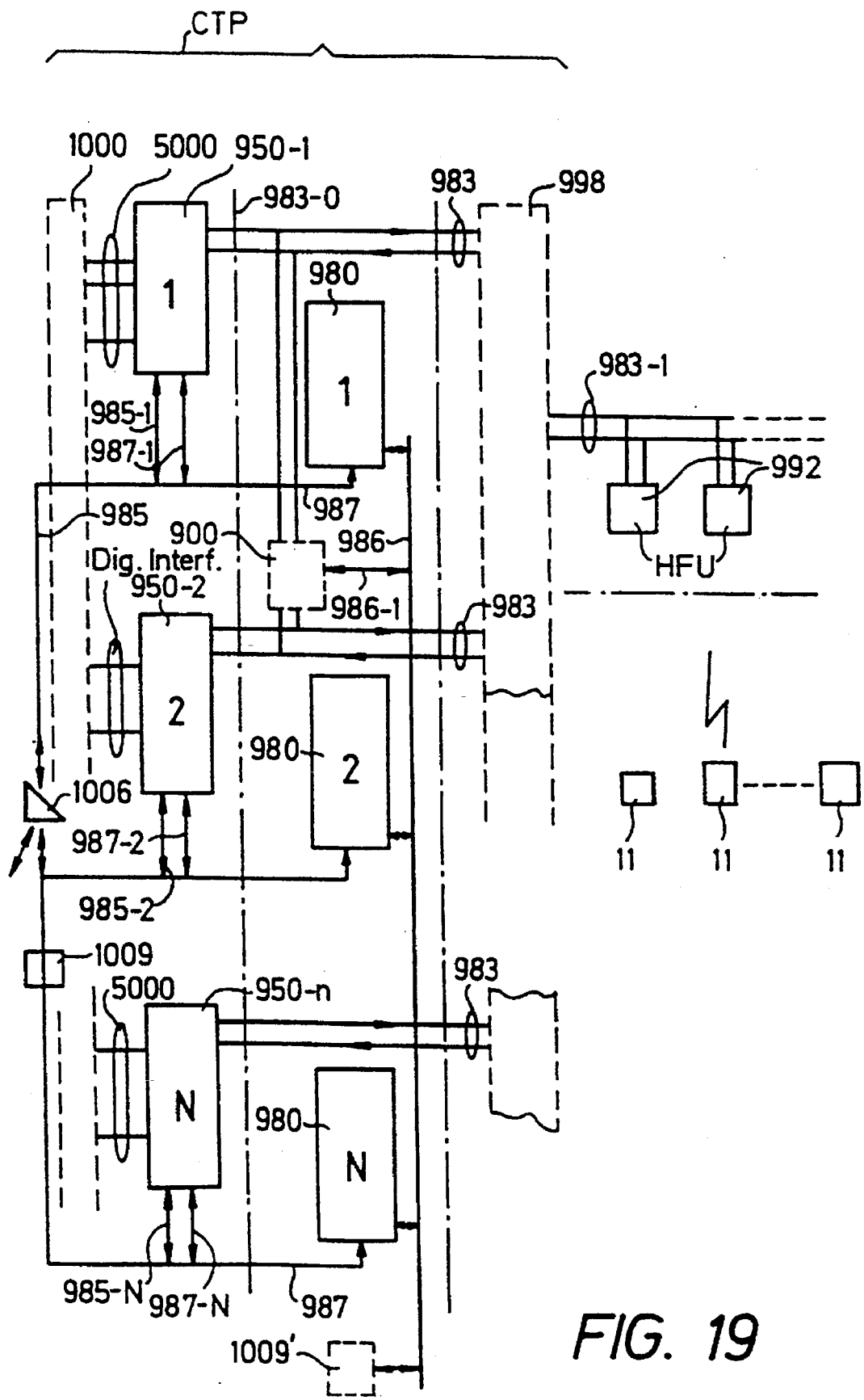
FIG. 19 shows a basic block diagram of units in a central terminating point (CTP), geographically spread out high frequency units, and communication links between said high frequency units and said low frequency units; also shown schematically is the connection of PS:s to the system through high frequency units.

FIG. 19 shows an embodiment of LHU functions and also the integration thereof towards the exterior. There is also an interface 5000 which in the embodiment is connected between an external switching system 1000 and a subsystem interface function 950-1. Said subsystem comprises a control function 980. Any allocation of time gaps in different directions, identification, status requests from PS units are made through said control function 980. The information is transferred through said communication interface 983 to different HFU units 992. When several HFU units interact common multiplexing functions 998 can be utilized for several CS units at for instance a SCS. Traffic switching between CS units are made integrated in said subsystem interface function 950-1 or by means of a separate switching function 950. The communication man-machine takes place through 1006. In other applications said communication can be provided at another level. Functions 1009, 1009' constitute one or several control functions for said systems or for an interactive cooperation and coordination between subsystems. The communication for cooperation, etc., between subsystems is handled through a communication channel 986. The corresponding communication man-machine is handled in a similar way.

Figure 20A:
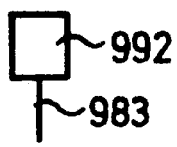
FIGS. 20a–20e show schematically various embodiments of a high frequency unit (HFU) arranged to be controlled in different types of implementations.
Figure 20B:
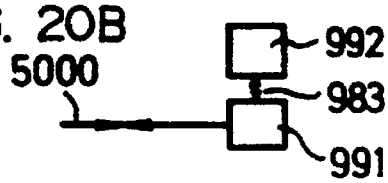
Figure 20C:
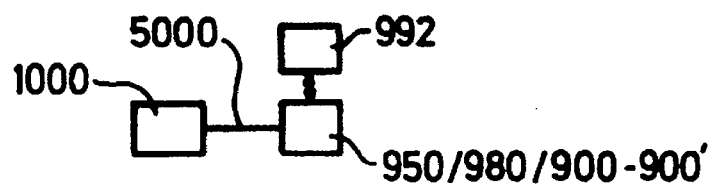
Figure 20D:
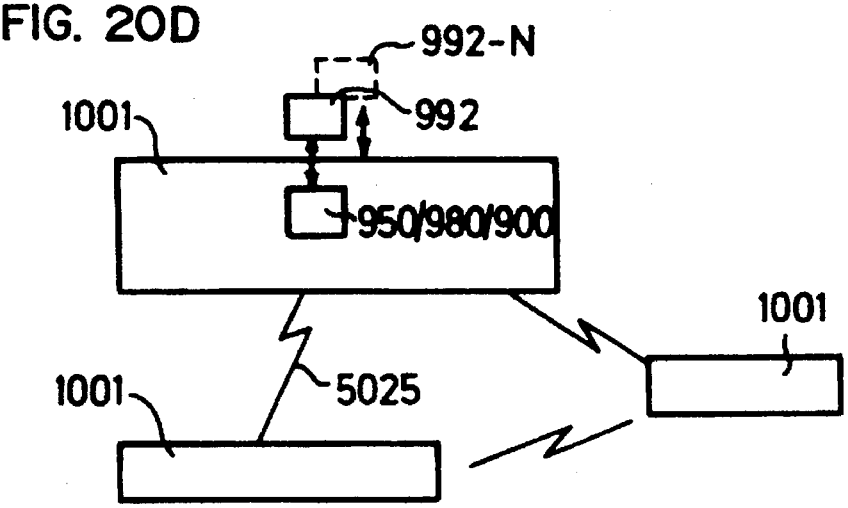
Figure 20E:
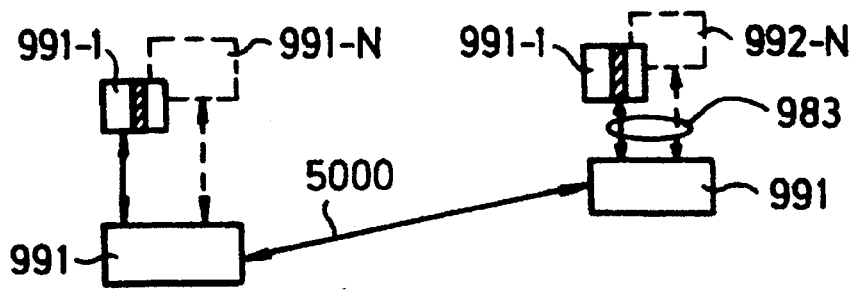

From FIGS. 20*a*–20*e*, further possibilities for a flexible and modular structure are apparent. A first part of said figures, FIGS. 20*a*–20*c*, shows master system modules that have been previously shown. When functions of said subsystems are integrated in a switching system an integration to networks is formed, see FIG. 20*d*. FIG. 20*e* shows how systems of different types will cooperate with each other, for instance at a CTP, through associated LFU units. One case is an example of a frequency duplex system interacting with a time duplex system.

FIG. 21 shows an example of a system where several CS units interact by transferring information between subsystems. Several SCS units handle traffic with each other. A few of said SCS units are terminated to an external network. A system implementation for fixed traffic can be based on the configuration shown below. Below a more detailed description of a system provided with a frequency band that one or several subsystems utilize, i.e. time duplex, is shown. A robust modulation is supplied, said modulation having a high degree of resistance to interference, for instance QPSK, with an efficient detecting and synchronizing, for instance differential detecting providing an economic and robust solution. As an alternative other signal processing methods could be applied. The interfaces for applied digital flows to/from CS units are for instance multiplexed or asynchronously multiplexed in a conventional way, ATD, "framed or frameless", or in any other digital form with varying rate that is synchronous or asynchronous and also unmultiplexed. The customer interfaces will vary according to demands and can for instance have the same rate as a CS or a lower rate, and can for instance both on a CS and a PS be 1,544 or 2,048 Mbit/s. The radio channel of each subsystem has a certain digital transmission capacity. Said capacity can be shared by geographically spread out users for transferring traffic in both directions. In a case with an integrated switching system said subsystem interface function 950 is considered to be integrated in the present switching system. The blocks shown therefor constitute functional blocks that are integrated in a suitable physical shape and not necessarily in separate physical units. The frame is divided into time gaps. Said time gaps are made of equal size and represent for instance a certain user capacity 8,16,32,56,64 kbit/s, 80 kbit/s, 128,144,156,160,192,284, etc. That is to have a certain capacity for each transferred package in each subsystem harmonizing with conventional transmission standards. This will make an interaction with other networks more easy. A specific factor for time duplex is that the information to be transferred is buffered on both sides before being transmitted. When the data after some time has been buffered it is transmitted in any direction and during any time period. The method is repeated continuously. Said control unit 981 for said radio and antenna unit, etc., of said CS unit will handle any associated direct control. Besides direction and time said antenna system can also include a function for varying the polarity or any other diversity measure. A corresponding control is made at the peripheral station. Said control unit of each of the PS units are in correspondence with the CS units, but there is no need for a dynamic redirection between different time gap intervals. Some functions, such as change of polarization, etc., for fixed directed systems will improve the total capacity and are implemented when required. The frequency, the code, new fixed directions to another central station, etc., are included where it is applicable. When PS units are used in mobile applications requiring for instance directed antennas towards associated CS units such functions are added. That is the shown function modules are structured in accordance with the actual demand in a suitable shape. It is clear that also hardware units of the PS units and functions also for CS units may vary when included. To illustrate an embodiment a system is described below, said system having a radio channel capacity in time duplex of approximately 45 Mbit/s and one frequency band. The time gap for each subsystem is for instance approximately 2 ms. For each transmitting time period and receiving time period, respectively, the time period of a time gap corresponds to approximately 160 Kbit/s at approximately 300 time gaps, each of which having an extension of 6 ms. That is approximately 300 time gaps of each system can be applied in each direction, if the capacity is chosen to be of the same size in said both directions. By for instance a time gap on SCSF, PSSF of 0.5 ms the time period of each time gap is decreased to 3 microseconds and the capacity thereof to approximately 80 Kbit/s. If coding is applied on the information or on the control information the capacity for a traffic is lowered. Said approximately 300 time gaps are used for customer information and for control data. Basically all or most of said time gaps are used when a favorable dynamic and adaptive correction possibility is generated at interferences, collision risks with other subsystems, etc. An advantage with time duplex as described above compared to frequency duplex is that in a traffic dynamic situation it is possible to have a flexible utilization of idle period for another traffic. In a normal conversation one person is normally silent while the other one talks. It will be possible to have an economic implementation of a PS, etc. In mobile systems a flexible "handover" can be created between subsystems without any necessity of changing frequency when switching between subsystems. ATM, Asynchronous Transfer Mode, having defined lengths of information packages and control signaling, etc., is implemented for a time and space control system when required, for instance for the transfer of transparent flows as previously mentioned. A split up utilization of a channel capacity up to maximum capacity is flexible when modular structure of frame structures are applied in the radio system. If each time gap on said radio channel corresponds to a certain capacity, for instance 64 Kbit/s, and said capacity is substantially lower than the total radio channel capacity modular dynamic speed rates can be implemented to function to and from different applications for different customers of the system. For instance modular subrates can be created from the 64 Kbit/s as defined in the example as a multiple of the rate of the time gap. For instance 32 Kbit/s can be obtained by transmitting only every second time. A disadvantage with such an embodiment is a higher delay. Such a principle can be utilized to create a slow polling of several PS units, for instance in a case where many stations are connected in a network without any requirement of higher capacity, redundancy, etc., or when customers not using the associated PS not should load the system. To keep low the delay of transmission flows through the systems for instance frequency duplex can be applied instead of time duplex. Thanks to a flexible modular structure in said networks information that is applied to the system can be transmitted to said high frequency unit HFU can be supplied in a flexible way with control and time information if it is desirable to separate said high frequency unit and said low frequency unit. For ATM type signals such control information can be applied in any desired cells of the bit flow. In a corresponding way there could be a similar adaptation between HFU and LFU when utilizing other types of transmission through other types of multiplexed signals. Thus, at said HFU parts of the transmission flow are utilized for, for instance, timing and controlling said high frequency unit such that there is a control of time and direction, optionally the energy, polarization, frequency, etc., at said HFU. Thus, said HFU unit can be arranged as a controlled remote unit without any demands of control function. Primarily selections of time, directions, etc., are made at said LFU. While several LFU units can terminate at the same location a system control that is more superior can be provided at that location without the necessity of transporting control information between different control units of different spread out HFU units. Systems can be provided with a controlled or an automatic search for PS units from each CS. When an automatic station identification process is to be applied a PS, for instance being moved from one region to another, should be identified at the new location. This could be done for instance when power is supplied or by reception of an identification signal from any or from a chosen CS, or when being started in any other way. When an identification process is finished the PS unit identified is defined as to direction and distance, and afterwards said PS unit can handle traffic in the system. Sensing of existence of new stations is done by transmitting requests in different directions and then wait for a reply, and also transmit any required basic data and successively traffic data allocation, etc., from a PS to a CS. When a PS is provided with an automatic identification, logging in, and where several subsystems in a geographic area operate at the same frequency band basically communication can be established over an unlimited geographic area, should there be provided a network with several CS units.

If an automatic sensing logging in is not applied a manual initiation, for instance handled by an operator, can be provided in alternative covering areas. A PS which is arranged for communication at different frequency bands can communicate with systems operating at different frequency bands by choosing for instance a new local oscillator frequency, etc. High frequency parts from each CS are disposed on an appropriate location, for instance in a tower, on roofs, in a satellite, etc. In such cases where two or more CS units are provided to cover basically the same geographic area each of the high frequency parts can be disposed comparatively close together without any deterioration of the system properties. This is possible because they are coordinated, when required, to delimit the interference between each other by not choosing directions generating interference during the same time period. Said high frequency part and said low frequency part are separated physically when required by a fiber link, a microwave link, satellite, light wave link, coax cable, etc. Field termination can for instance be done through multiplex units, a digital cross connect, DCC, etc. At a common utilization of for instance one and the same terminating point CTP by different subsystems there is an efficient coordination of time differences between frames in different subsystems, a switching of traffic, calculations of interferences, etc. Besides what is shown in the implementation embodiments the method basically can be integrated into or cooperate with networks with existing systems of such types as TDMA, FDMA, Spread Spectrum, or combinations of said types for narrow band or wide band mobile communications networks, such as for instance PCN, GSM, DECT or similar systems in Europe, USA and Japan. When for instance implementing the present method for GSM a so called Base Transceiver Station, BTS is provided with an antenna system that can be coordinated as to direction and time. The control function 981 of said HFU units are to different levels adapted of independent switching or functions allowed by said control function 980 of the subsystem. As an alternative the control function 981 is coordinated by common control functions, 1009, 1009' in several subsystems.

What is claimed is:

1. A method for communicating in a wide area through a wide area radio communication system, said system comprising at least two central stations receiving and transmitting user information and control information as digital signals, each of said central stations being associated with at least one peripheral station and covering a service area which at least in part is common to said two central stations, said central stations and said peripheral stations comprising transmission timing means, the method comprising the steps of:

connecting operatively at least one peripheral station to at least two central stations;

receiving and transmitting digital signals in a low frequency unit of one of the central stations;

arranging at least said two central stations at a common physical site to cover common parts of a service area, operating said central and peripheral stations to transmit and receive digital signals by utilizing radio signals at at least one common frequency;

transferring said digital signals between said low frequency unit and a high frequency unit of said central station, said high frequency unit transmitting and receiving said radio signals to and from associated central and peripheral stations; and redirecting, in response to control means of said low frequency unit, digital signals received by said low frequency unit of a first central station of at least two central stations to the low frequency unit of a second central station of at least two central station to by-pass the high frequency unit of said first central station upon the occurrence of a predetermined condition in order to accomplish transmission redundancy in said common parts of said service area.

2. A method of claim 1 further comprising a step of operating said stations in TDMA frame structures.

3. A method of claim 1 further comprising a step of operating said stations in a CDMA system.

4. A method of claim 1 further comprising a step of operating said stations in a FDMA system.

5. A method of claim 1 further comprising a the step of operating said stations in a combined TDMA and FDMA system.

6. A method of claim 5 further comprising a step of operating said stations in a combined TDMA and CDMA system.

7. A method of claim 5 further comprising a step of selecting alternative antenna polarizations to optimize transmission quality.

8. A method of claim 7 further comprising the steps of:

generating synchronization timing data in one of said central stations; and transmitting said synchronization timing data from said central station to the peripheral stations associated thereto.

9. A method of claim 8 further comprising a step of signal processing incoming data in said central and peripheral stations to decrease interference and signal deterioration.

10. A wide area radio communication system, comprising:

at least two central stations receiving and transmitting user information and control information as digital signals, each of said central stations being associated with at least one peripheral station and covering a service area which at least in part is common to said two central stations, said central stations and said peripheral stations comprising transmission timing means;

said central and peripheral stations including radio transmission means for transmitting and receiving radio signals;

at least one specific peripheral station being operatively connected to said at least two central stations operating in a common service area and being located in a common physical site;

said two central stations comprising a high frequency unit and a low frequency unit that are operatively connected to each other for transmission of digital signals, said high frequency unit of each of said two central stations comprising said radio transmission means operating at at least one common frequency and means for directing in space said radio transmission to said specific peripheral station; and the low frequency unit of a first central station of at least two central stations comprising control means for providing redirection of incoming digital signals to the low frequency unit of a second central station to by-pass the high frequency unit of said first central station upon the occurrence of a predetermined condition in order to accomplish transmition redundancy in said common part of said service area.

11. A system of claim 10, wherein at least one peripheral station is a mobile station.

12. A system of claim 10, wherein at least one peripheral station is provided with a directed antenna.

13. A system of claim 10, wherein:

at least two central stations are arranged in one service area to cover a common set of peripheral stations, so as to provide redundancy in said service area; and said central stations are operatively connected, so as to separate in time the transmission from different central stations to each of said peripheral stations.

14. A system of claim 10, wherein:

at least two central stations are arranged in one service area to cover a common set of peripheral stations, so as to increase capacity in said service area; and said central stations are operatively connected, so as to separate in time the transmission from different central stations to each of said peripheral stations.

15. A system of claim 10, wherein said high frequency unit of a central station is arranged in a fixed location.

16. A system of claim 10, wherein at least said high frequency unit of a central station is arranged in a satellite.

17. A system of claim 10, wherein at least one peripheral station is provided with an omnidirectional antenna.

18. A system of claim 17, wherein CDMA is used in combination with spread spectrum modulation.

19. A system of claim 17, wherein the system is operating in TDMA.

20. A system of claim 17, wherein the system is operating in a combination of TDMA and CDMA.

21. A system of claim 17, wherein the system is operating in on a time division duplex basis.

22. A system of claim 17, wherein the system is operating in on a frequency division duplex basis.

23. A system of claim 17, wherein low frequency units of at least two central stations are integrated in an external switching system.

24. A system of claim 17, wherein the system is integrated in a GSM system.

25. A system of claim 17, wherein that the system is integrated in a PCN system.

26. A system of claim 17, wherein the system is integrated in a DECT system.

27. A system of claim 17, wherein spread spectrum modulation is implemented therein.

28. A system of claim 27, wherein frequency hopping is used in combination with spread spectrum modulation.

* * * * *